US009219854B2

United States Patent
Yoshino

(10) Patent No.: US 9,219,854 B2
(45) Date of Patent: Dec. 22, 2015

(54) IMAGING DEVICE, METHOD FOR CONTROLLING IMAGING DEVICE, AND INFORMATION STORAGE DEVICE

(71) Applicant: OLYMPUS CORPORATION, Tokyo (JP)

(72) Inventor: Koichiro Yoshino, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 104 days.

(21) Appl. No.: 14/220,297

(22) Filed: Mar. 20, 2014

(65) Prior Publication Data

US 2014/0300799 A1  Oct. 9, 2014

(30) Foreign Application Priority Data

Apr. 5, 2013  (JP) .................................. 2013-079863

(51) Int. Cl.
*H04N 5/232* (2006.01)
*H04N 5/225* (2006.01)

(52) U.S. Cl.
CPC ....... *H04N 5/23212* (2013.01); *H04N 5/23296* (2013.01); *H04N 2005/2255* (2013.01)

(58) Field of Classification Search
CPC . H04N 5/23245; H04N 5/347; H04N 5/3456; H04N 5/23212; H04N 5/2351; H04N 5/351; H04N 5/23293; H04N 5/23296; H04N 2005/2255
USPC ........................................................ 348/347
See application file for complete search history.

(56) References Cited

U.S. PATENT DOCUMENTS

| | | | | |
|---|---|---|---|---|
| 2007/0097219 A1* | 5/2007 | Nomura | ............. | H04N 5/23248 348/208.7 |
| 2009/0213231 A1* | 8/2009 | Kurokawa | .......... | H04N 5/23248 348/208.1 |
| 2010/0149353 A1* | 6/2010 | Jang | .................... | H04N 5/23296 348/208.12 |
| 2010/0157102 A1* | 6/2010 | Kurokawa | .......... | H04N 5/23296 348/240.1 |
| 2011/0261251 A1* | 10/2011 | Okamoto | ............... | G02B 7/102 348/345 |
| 2012/0099830 A1* | 4/2012 | Shibuno | ............. | H04N 5/23209 386/224 |
| 2013/0120617 A1* | 5/2013 | Kim | .................... | H04N 5/23296 348/240.2 |

FOREIGN PATENT DOCUMENTS

| | | |
|---|---|---|
| JP | 10-239579 A | 9/1998 |
| JP | 2004-294788 A | 10/2004 |

* cited by examiner

*Primary Examiner* — Pritham Prabhakher
(74) *Attorney, Agent, or Firm* — Scully, Scott, Murphy & Presser, P.C.

(57) ABSTRACT

An imaging device includes an objective lens that includes a movable lens that is configured so that an in-focus object plane position is changed along with a change in angle of view, an image sensor that acquire an image, a focus control section that implements an autofocus (AF) operation by controlling a position of the movable lens, a reference lens position setting section that sets a reference lens position based on a moving range of the movable lens during a wobbling operation, the wobbling operation being performed every given cycle during the AF operation, and a magnification correction section that performs a magnification correction process that reduces a change in the angle of view of the image due to a change in the position of the movable lens during the wobbling operation relative to the reference lens position.

22 Claims, 16 Drawing Sheets

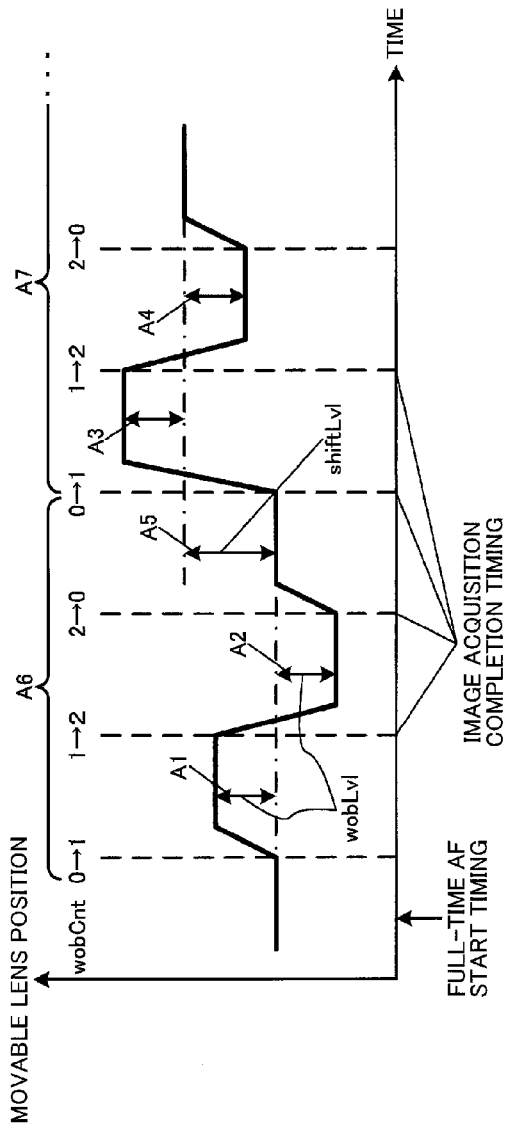
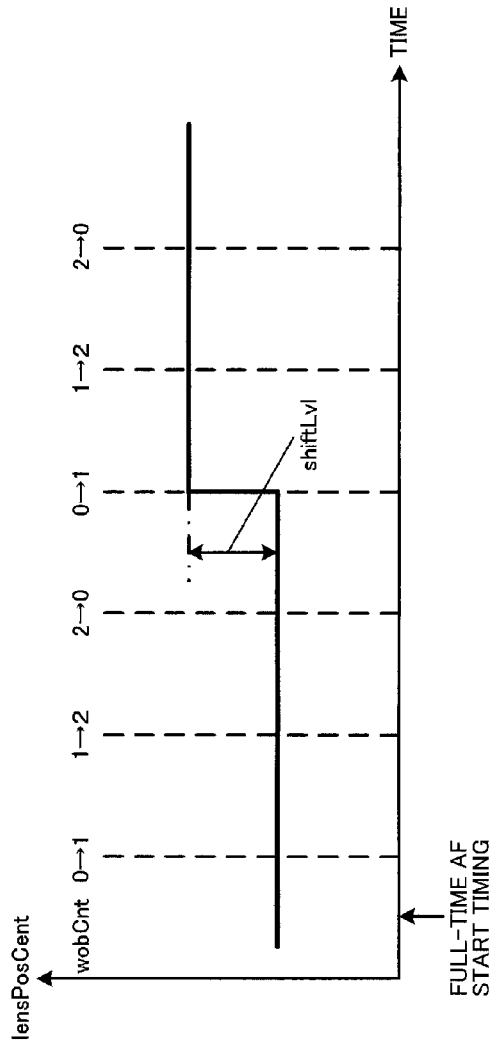
FIG. 13A
FIG. 13B

| | MOVABLE LENS POSITION | IMAGE HEIGHT |
|---|---|---|
| WIDE END | A | x'_A |
| | B | x'_B |
| | C | x'_C |
| | D | x'_D |
| | E | x'_E |
| TELE END | F | x'_F |

US 9,219,854 B2

IMAGING DEVICE, METHOD FOR CONTROLLING IMAGING DEVICE, AND INFORMATION STORAGE DEVICE

Japanese Patent Application No. 2013-079863 filed on Apr. 5, 2013, is hereby incorporated by reference in its entirety.

BACKGROUND

The present invention relates to an imaging device, a method for controlling an imaging device, an information storage device, and the like.

An endoscope system having a zoom function has been put to practical use, the endoscope system being configured so that the entire digestive tract (object) is observed on the wide-angle (WIDE) side (normal observation), and part of the digestive tract is observed in a zoom state on the telescopic (TELE) side (zoom observation) by adjusting the angle of view of the objective lens by moving a movable lens.

The endoscope system having a zoom function is normally configured to implement the magnification necessary for zoom observation by moving the movable lens to reduce the angle of view on the TELE side (i.e., increase the optical magnification) while adjusting the in-focus object plane position. Specifically, the object can be more closely observed by designing the objective lens so that the in-focus object plane position decreases on the TELE side, and the magnification during zoom observation can be increased.

The moving amount of the image position due to the movement of the position of the object increases as the distance from the objective lens to the in-focus object plane position decreases, and the depth of field of the optical system normally becomes shallow. Therefore, the TELE-side depth of field of the endoscope system having a zoom function may be 1 mm or less, and it may be difficult for the user to bring the object into focus. In order to solve the above problem, JP-A-2004-294788 proposes an endoscope system that calculates a contrast value (i.e., an evaluation value that indicates the degree of in-focus of the image) from the high-frequency component of the image to evaluate the in-focus state, and performs an autofocus (AF) operation, for example. JP-A-10-239579 proposes a video camera having a function (full-time AF function) that calculates a contrast value while wobbling the focus lens to detect the in-focus direction, and cyclically moves the focus lens in the in-focus direction to continuously bring the object into focus so as to follow the object in a movie.

It is difficult to maintain the distance (object distance) from the objective lens to the object to be constant during zoom observation using an endoscope due to pulsation of the object and the like. Therefore, even if the user has temporarily brought the object into focus using a single AF operation, the object becomes out of focus due to a change in the object distance, and observation by the user is hindered.

It is desirable to perform the full-time AF operation as disclosed in JP-A-10-239579 in order to solve the above problem.

SUMMARY

According to one aspect of the invention, there is provided an imaging device comprising:

an objective lens that includes a movable lens that is configured so that an in-focus object plane position is changed along with a change in angle of view;

an image sensor that photoelectrically converts an object image formed by the objective lens to acquire an image;

a focus control section that implements an autofocus (AF) operation by controlling a position of the movable lens;

a reference lens position setting section that sets a reference lens position based on a moving range of the movable lens during a wobbling operation, the reference lens position being a reference position of the movable lens, and the wobbling operation being performed every given cycle during the AF operation; and a magnification correction section that performs a magnification correction process that reduces a change in the angle of view of the image due to a change in the position of the movable lens during the wobbling operation relative to the reference lens position.

According to another aspect of the invention, there is provided a method for controlling an imaging device comprising:

acquiring an image obtained by photoelectrically converting an object image formed by an objective lens that includes a movable lens that is configured so that an in-focus object plane position is changed along with a change in angle of view;

setting a reference lens position based on a moving range of the movable lens during a wobbling operation, the reference lens position being a reference position of the movable lens, and the wobbling operation being performed every given cycle during an autofocus (AF) operation; and performing a magnification correction process that reduces a change in the angle of view of the image due to a change in position of the movable lens during the wobbling operation relative to the reference lens position.

According to another aspect of the invention, there is provided a computer-readable storage device with an executable program stored thereon, wherein the program instructs a computer to perform steps of:

acquiring an image obtained by photoelectrically converting an object image formed by an objective lens that includes a movable lens that is configured so that an in-focus object plane position is changed along with a change in angle of view;

setting a reference lens position based on a moving range of the movable lens during a wobbling operation, the reference lens position being a reference position of the movable lens, and the wobbling operation being performed every given cycle during an autofocus (AF) operation; and performing a magnification correction process that reduces a change in the angle of view of the image due to a change in position of the movable lens during the wobbling operation relative to the reference lens position.

BRIEF DESCRIPTION I/F THE DRAWINGS

FIG. 13A is a view illustrating a change in movable lens position during a wobbling operation, and FIG. 13B is a view illustrating a change in wobbling center position.

DESCRIPTION I/F EXEMPLARY EMBODIMENTS

Figure 1:
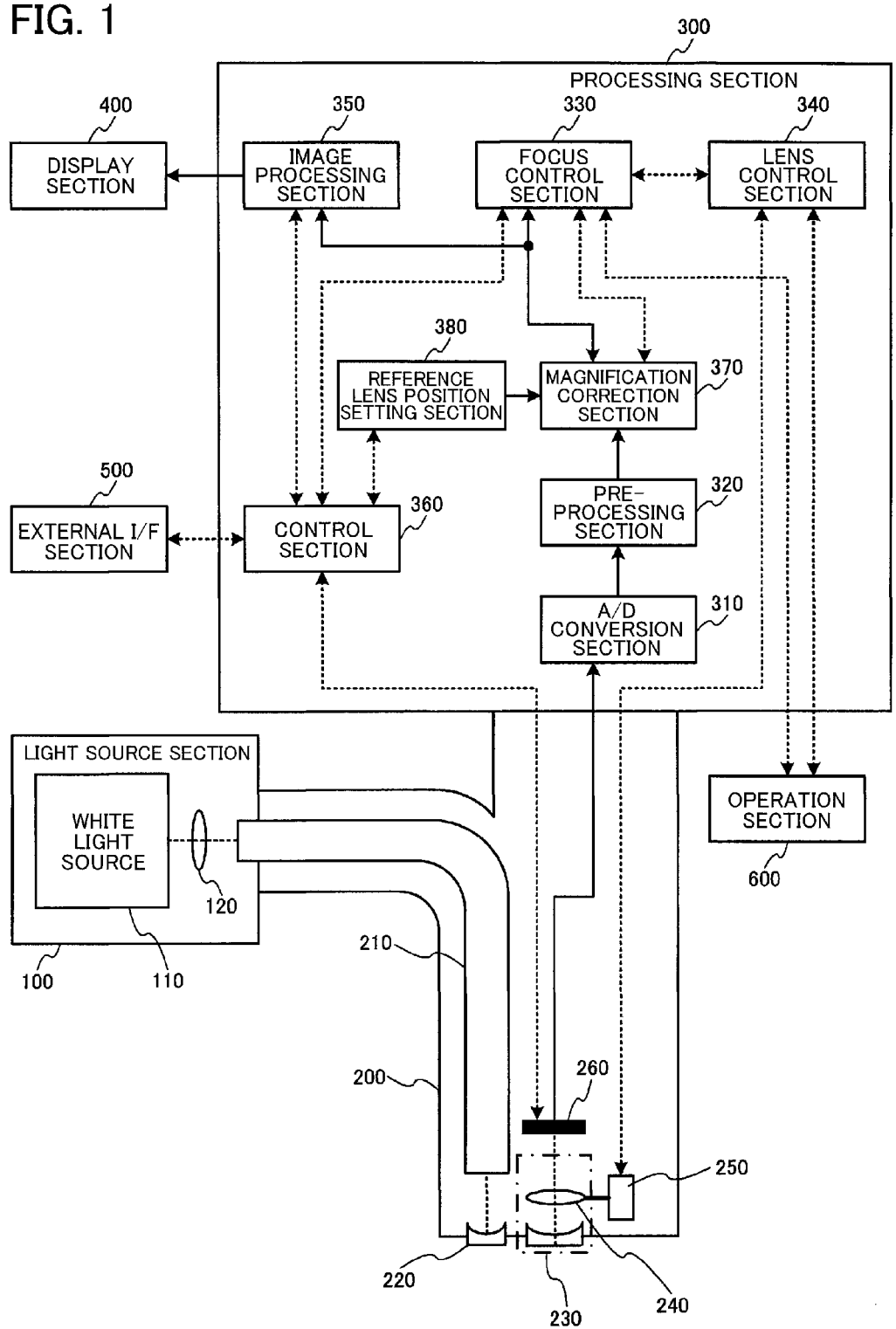
FIG. 1 illustrates a configuration example of an endoscope system corresponding to an imaging device according to one embodiment of the invention.

According to one embodiment of the invention, there is provided an imaging device comprising:

an objective lens that includes a movable lens that is configured so that an in-focus object plane position is changed along with a change in angle of view;

an image sensor that photoelectrically converts an object image formed by the objective lens to acquire an image;

a focus control section that implements an autofocus (AF) operation by controlling a position of the movable lens;

a reference lens position setting section that sets a reference lens position based on a moving range of the movable lens during a wobbling operation, the reference lens position being a reference position of the movable lens, and the wobbling operation being performed every given cycle during the AF operation; and a magnification correction section that performs a magnification correction process that reduces a change in the angle of view of the image due to a change in the position of the movable lens during the wobbling operation relative to the reference lens position.

According to another embodiment of the invention, there is provided a method for controlling an imaging device comprising:

acquiring an image obtained by photoelectrically converting an object image formed by an objective lens that includes a movable lens that is configured so that an in-focus object plane position is changed along with a change in angle of view;

setting a reference lens position based on a moving range of the movable lens during a wobbling operation, the reference lens position being a reference position of the movable lens, and the wobbling operation being performed every given cycle during an autofocus (AF) operation; and performing a magnification correction process that reduces a change in the angle of view of the image due to a change in position of the movable lens during the wobbling operation relative to the reference lens position.

According to another embodiment of the invention, there is provided a computer-readable storage device with an executable program stored thereon, wherein the program instructs a computer to perform steps of:

acquiring an image obtained by photoelectrically converting an object image formed by an objective lens that includes a movable lens that is configured so that an in-focus object plane position is changed along with a change in angle of view;

setting a reference lens position based on a moving range of the movable lens during a wobbling operation, the reference lens position being a reference position of the movable lens, and the wobbling operation being performed every given cycle during an autofocus (AF) operation; and performing a magnification correction process that reduces a change in the angle of view of the image due to a change in position of the movable lens during the wobbling operation relative to the reference lens position.

Exemplary embodiments of the invention are described below. Note that the following exemplary embodiments do not in any way limit the scope of the invention laid out in the claims. Note also that all of the elements described below in connection with the following exemplary embodiments should not necessarily be taken as essential elements of the invention.

1. Method

Figure 16:
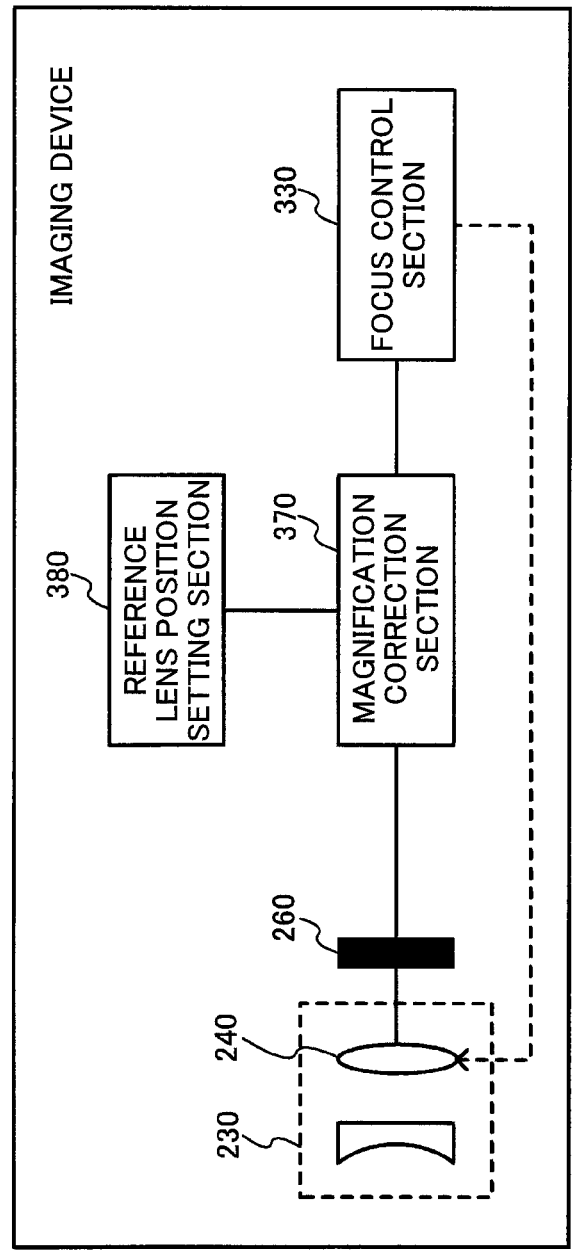
FIG. 16 illustrates a configuration example of an imaging device according to one embodiment of the invention.

As illustrated in FIG. 16, an imaging device according to several embodiments of the invention includes an objective lens 230 that includes a movable lens 240 that is configured so that the in-focus object plane position is changed along with a change in angle of view, an image sensor 260 that photoelectrically converts an object image formed by the objective lens 230 to acquire an image, a focus control section 330 that implements a full-time autofocus (AF) operation by controlling the position of the movable lens 240, a reference lens position setting section 380 that sets a reference lens position that is a reference position of the movable lens 240 during the full-time AF operation, and a magnification correction section 370 that performs a magnification correction process on the image based on the reference lens position and the position of the movable lens 240, wherein the reference lens position setting section 380 sets the reference lens position based on the moving range of the movable lens 240 due to a wobbling operation during the full-time AF operation, and the magnification correction section 370 performs the magnification correction process that reduces a change in angle of view of the image due to a change in position of the movable lens 240 during the wobbling operation relative to the reference lens position.

A method according to several embodiments of the invention that is applied to the imaging device is described below. A single-lens drive configuration (see FIG. 2) is designed so that the in-focus object plane position is changed by moving the zoom lens (e.g., movable lens 240). Specifically, the imaging magnification changes as a result of changing (moving) the in-focus object plane position. Therefore, when implementing the AF operation using the single-lens drive configuration, a problem may occur when calculating an AF evaluation value (e.g., contrast value) used for the AF operation.

The term "in-focus object plane position" used herein refers to the position of the object (object point) relative to a reference position when a system including the object, the imaging optical system, the image plane, and the like is in an in-focus state. Specifically, when the image plane is set to a given position, and the imaging optical system is set to a given state, the in-focus object plane position refers to the position of the object when the image formed in the image plane through the imaging optical system is in focus. A focus control device (or endoscope system) and the like according to several embodiments of the invention are designed on the assumption that the image plane coincides with the plane of the image sensor included in the imaging section, and the in-focus object plane position can be determined by determining the state of the optical system when the plane of the image sensor is fixed.

When implementing a contrast AF operation, the contrast values may be calculated while changing the in-focus object plane position, and the relationship between a plurality of AF evaluation values may be calculated to determine the maximum value among the calculated contrast values. The full-time AF operation to which several embodiments of the invention are applied performs the wobbling operation that moves the movable lens within a given wobbling width around a given center position, compares the contrast value at a timing when the movable lens has been moved to the wide-angle side with the contrast value at a timing when the movable lens has been moved to the telescopic side, and shifts the center position using the comparison result. The details of the wobbling operation are described later.

When using the single-lens drive configuration, however, the imaging magnification is changed when the in-focus object plane position is changed. Therefore, since the magnification of the object differs between the image used to calculate the AF evaluation value at one timing and the image used to calculate the AF evaluation value at another timing, it may be difficult to stably calculate the AF evaluation value. For example, when the imaging magnification has increased (i.e., when the image has been magnified) during the AF operation, the high-frequency component included in the image is shifted to the low-frequency side (i.e., the edge is rounded), whereby a difference in AF evaluation value calculation conditions occurs. In this case, it may be difficult to appropriately compare the AF evaluation values, and the AF operation may be hindered.

In order to solve the above problems, several embodiments of the invention propose a method that sets the reference lens position (i.e., reference movable lens position), and performs the magnification correction process that compensates for a change in movable lens position relative to the reference lens position on an image (captured image). Specifically, when the movable lens position has changed relative to the reference lens position, the angle of view of the image acquired at the movable lens position differs from the angle of view of the image acquired at the reference lens position. The magnification correction process according to several embodiments of the invention reduces such a change in angle of view.

Specifically, even when the movable lens position has changed due to the wobbling operation, the angle of view of the image obtained by the magnification correction process is almost equal to (ideally identical to) the angle of view of the image captured at the reference lens position as a result of performing the magnification correction process according to several embodiments of the invention. This means that a focus control process can be implemented with high accuracy by performing an AF process (e.g., contrast value calculation process) based on the image obtained by the magnification correction process.

When the imaging magnification changes due to the wobbling of the zoom lens when calculating the AF evaluation value, the magnification (angle of view) of the display image presented to the user (doctor) frequently changes. However, a frequent change in angle of view of the display image tends to be stressful for the doctor when the doctor performs diagnosis based on the display image, and may hinder an appropriate diagnosis. The magnification correction process can also deal with the above problem.

When using a device such as an endoscope system that is configured so that the relative positional relationship (relative distance in a narrow sense) between the object and the imaging section frequently changes, it is preferable to employ the full-time AF operation that utilizes the wobbling operation instead of the single AF operation. In several embodiments of the invention, the reference lens position may be set every cycle of the wobbling operation.

As described later with reference to FIGS. 13A and 13B, the wobbling operation determines a given center position, and moves the movable lens position to the TELE side (A1 in FIG. 13A) or the WIDE side (A2 in FIG. 13A) relative to the center position by a given wobbling width. When one cycle of the wobbling operation has ended, the center position is shifted by a given shift level using the results obtained by the wobbling operation. The contrast value when the movable lens position is moved to the TELE side (A1) is compared with the contrast value when the movable lens position is moved to the WIDE side (A2), and the contrast value when the movable lens position is moved to the TELE side (A1) or the WIDE side (A2) is not compared with the contrast value in the next cycle (see A3 and A4, for example). Specifically, it suffices that an identical reference be used within one cycle of the wobbling operation from the viewpoint of stably calculating the contrast value. An identical reference need not be used in the first cycle of the wobbling operation (e.g., A6 in FIG. 13A) and the second cycle (e.g., A7) that differs from the first cycle.

A problem may occur when an identical reference lens position is used in a plurality of cycles. For example, the movable lens may be moved toward the wide-angle side as compared with the start timing as a result of performing the full-time AF operation when the reference position that has been set at the start of the AF operation is continuously used. In this case, a wide-angle image is acquired that captures a wide range of the object, but part of the image is magnified since the magnification correction process is performed that maintains a narrow angle of view almost equal to that at the start of the AF operation. As a result, the output image obtained by the magnification correction process has a resolution lower than that of the image sensor (i.e., the performance of the sensor cannot be sufficiently utilized).

Therefore, the reference lens position is desirably set every cycle of the wobbling operation. For example, the wobbling center position may be set to be the reference lens position, as described later. This makes it possible to reduce the effects of a change in the movable lens position relative to the center position (e.g., a change in angle of view (see A1 and A2)) without reducing a shift by the shift level (e.g., a change in angle of view (see A5)). Therefore, the image obtained by the magnification correction process is displayed as if the movable lens position moves as illustrated in FIG. 13B, and it is possible to reflect a global (low-frequency) change in angle of view in the image while suppressing a local (high-frequency) change in angle of view.

The following description is given taking an endoscope system (endoscope device) as an example of the imaging device (see FIG. 1 and the like). Note that the endoscope system is merely an example of the imaging device, and the method according to several embodiments of the invention may be applied to various imaging devices having the single-lens drive configuration.

2. First Embodiment

An endoscope system that includes an imaging device according to a first embodiment of the invention is described below with reference to FIG. 1. The endoscope system according to the first embodiment includes a light source section 100, an imaging section 200, a processing section 300, a display section 400, an external I/F section 500, and an operation section 600.

The light source section 100 includes a white light source 110 that emits white light, and a condenser lens 120 that focuses the white light on a light guide fiber 210.

The imaging section 200 is formed to be elongated and flexible so that the imaging section 200 can be inserted into a body cavity or the like. The imaging section 200 includes the light guide fiber 210 that guides the light focused by the light source section 100, an illumination lens 220 that diffuses the light guided by the light guide fiber 210, and applies the diffused light to an observation target, an objective lens 230 that focuses reflected light from the observation target, a movable lens 240 that is included in the objective lens 230, and simultaneously adjusts the angle of view and the in-focus object plane position, a lens driver section 250 that drives the movable lens 240, and an image sensor 260 that photoelectrically converts the reflected light focused by the objective lens 230 to generate an image. The lens driver section 250 is implemented by a voice coil motor (VCM), for example. The image sensor 260 is an image sensor that includes a Bayer color filter array, for example.

Figure 2:
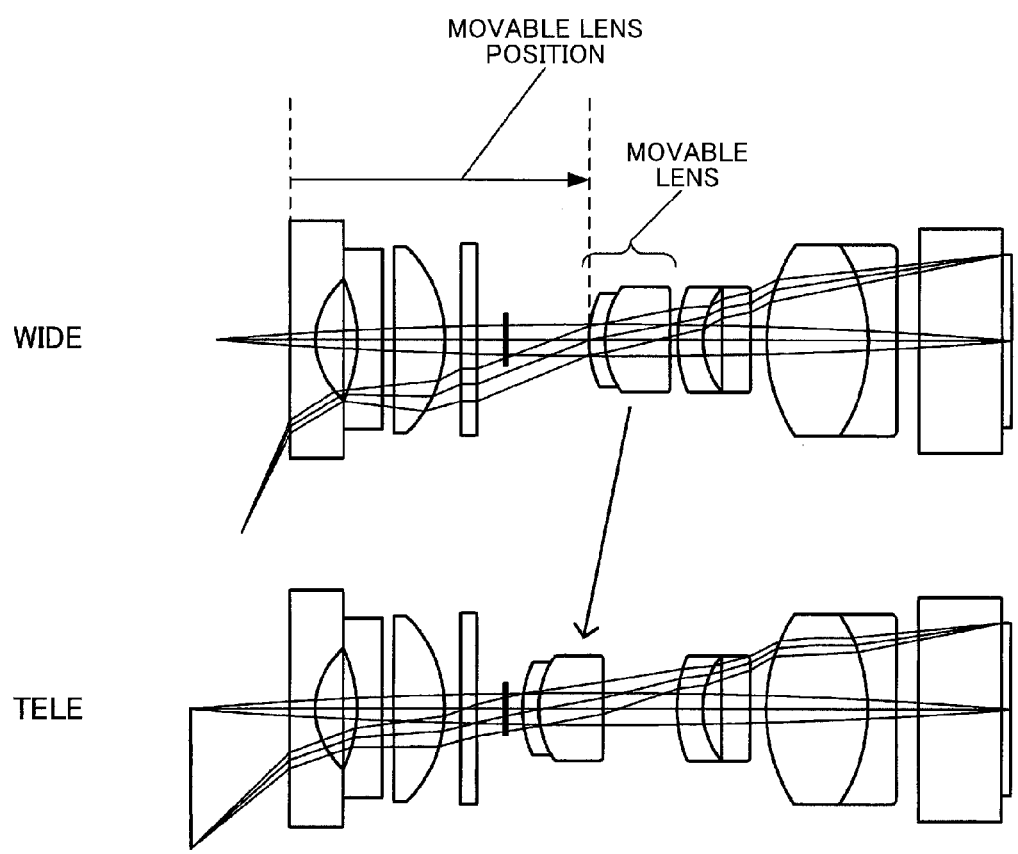
FIG. 2 illustrates a configuration example of an objective lens (single-lens drive configuration) according to one embodiment of the invention.
Figure 3:
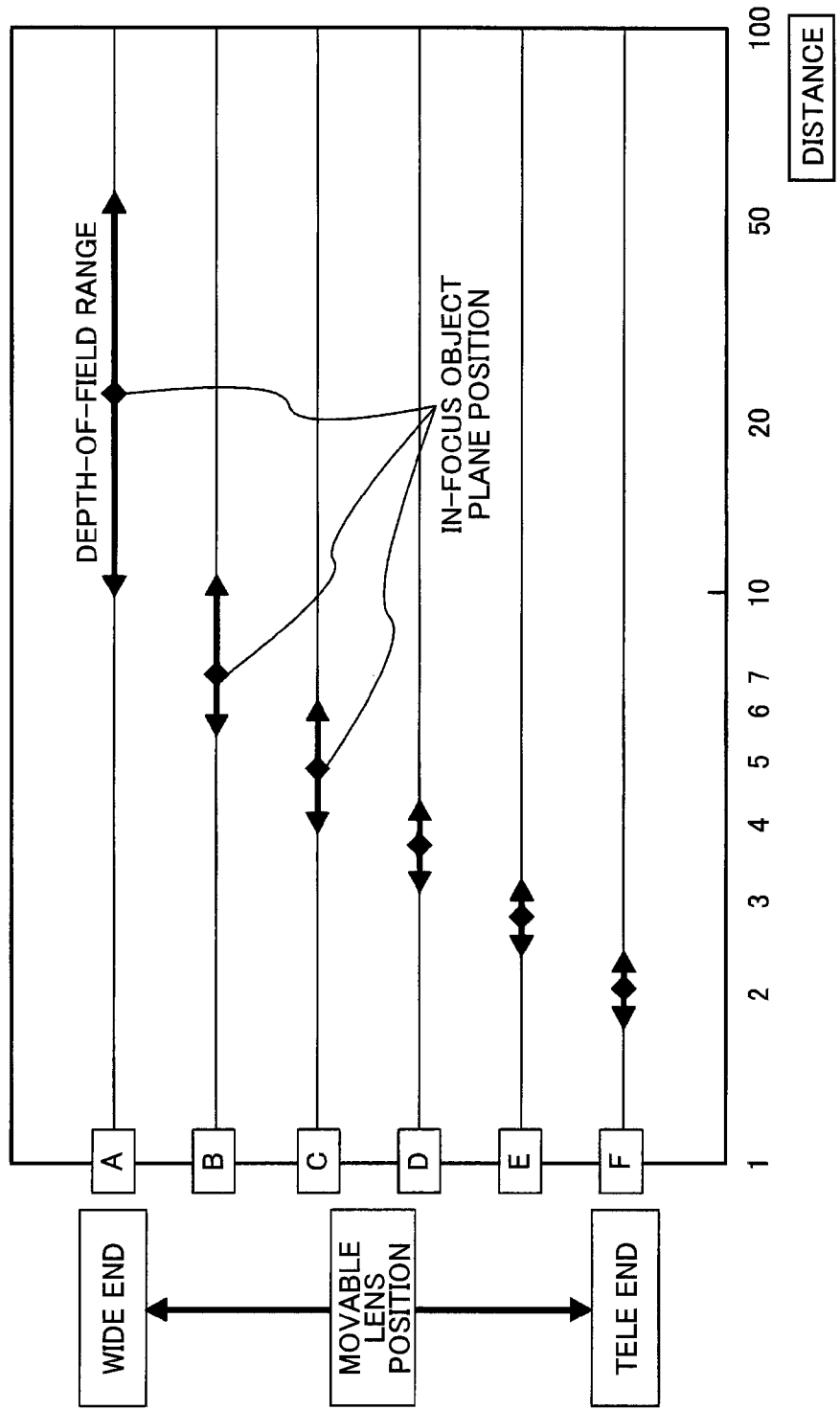
FIG. 3 is a view illustrating the relationship between a movable lens position, an in-focus object plane position, and a depth-of-field range.

FIG. 2 illustrates an example of the objective lens 230 according to the first embodiment. The objective lens 230 is designed so that the angle of view becomes narrow (i.e., the optical magnification increases) and the in-focus object plane position decreases when the position of the movable lens 240 is moved from the WIDE end to the TELE end. For example, the in-focus object plane position and the depth-of-field range illustrated in FIG. 3 are implemented by adjusting the position of the movable lens 240.

The processing section 300 includes an A/D conversion section 310, a preprocessing section 320, a focus control section 330, a lens control section 340, an image processing section 350, a control section 360, a magnification correction section 370, and a reference lens position setting section 380.

The A/D conversion section 310 converts analog signals sequentially output from the image sensor 260 into a digital image, and sequentially outputs the digital image to the preprocessing section 320. The preprocessing section 320 performs image processing (e.g., white balance process and interpolation process (demosaicing process)) on the image output from the AD conversion section 310, and sequentially outputs the resulting image to the magnification correction section 370. The magnification correction section 370 is connected to the focus control section 330. The magnification correction section 370 performs a magnification correction process on the image output from the preprocessing section 320 according to information output from the focus control section 330, and sequentially outputs the resulting image to the focus control section 330 and the image processing section 350. The details of the magnification correction section 370 are described later.

The focus control section 330 is connected to the lens control section 340, the control section 360, the operation section 600, and the magnification correction section 370, and performs an AF control operation according to an AF start/stop signal output from the operation section 600. The focus control section 330 outputs the lens position (required lens position) required for the movable lens 240 to the lens control section 340. The focus control section 330 outputs information necessary for the magnification correction process to the magnification correction section 370. The focus control section 330 acquires a control signal for controlling the image sensor 260 (e.g., image acquisition end timing signal) from the control section 360. The details of the focus control section 330 are described later.

The lens control section 340 is connected to the lens driver section 250, the focus control section 330, and the operation section 600, and controls the movable lens according to the required lens position output from the operation section 600 and the focus control section 330. The details of the operation section 600 are described later.

The image processing section 350 is connected to the control section 360. The image processing section 350 performs image processing (e.g., color conversion process, grayscale transformation process, edge enhancement process, and noise reduction process) on the image output from the magnification correction section 370, and sequentially outputs the image signals to the display section 400. The display section 400 is a liquid crystal monitor, for example. The display section 400 displays the image signals output from the image processing section 350.

The reference lens position setting section 380 sets a reference lens position that is the position of the movable lens 240 used as a reference during the magnification correction process. The magnification correction process performed by the magnification correction section 370 is a process that generates an image as if the movable lens 240 were positioned at the reference lens position irrespective of the actual position of the movable lens 240. The details of the reference lens position setting section 380 are described later.

The control section 360 is connected to the external I/F section 500, the focus control section 330, the image processing section 350, the reference lens position setting section 380, the image sensor 260, and the like, and controls the external I/F section 500, the focus control section 330, the image processing section 350, the reference lens position setting section 380, the image sensor 260, and the like. The external I/F section 500 is an interface that allows the user to perform an input operation and the like on the endoscope system. The external I/F section 500 includes an adjustment button for adjusting an image processing parameter, and the like.

Figure 4:
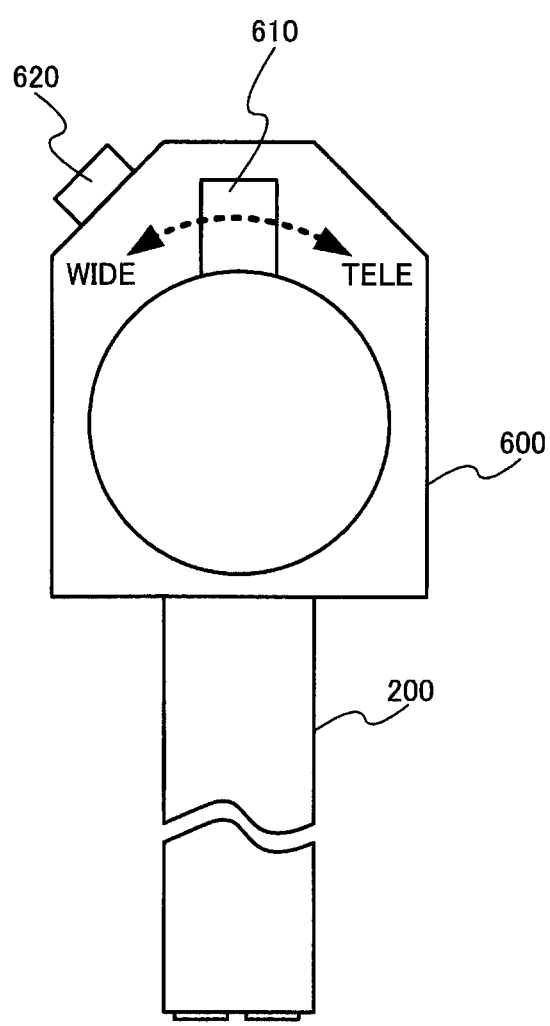
FIG. 4 illustrates a configuration example of an operation section.

The details of the operation section 600 are described below. FIG. 4 illustrates an example of the operation section 600 according to the first embodiment. The operation section 600 according to the first embodiment is integrated with the imaging section 200, for example. The operation section 600 includes a zoom lever 610 and an AF button 620. The zoom lever 610 can be continuously operated within a given range, for example. The user can continuously adjust the position of the movable lens 240 from the WIDE end to the TELE end by moving the zoom lever 610. Specifically, the operation section 600 converts position information about the zoom lever 610 into the required lens position, and outputs the required lens position to the lens control section 340, for example. The operation section 600 alternately outputs a full-time AF start/stop signal to the focus control section 330 each time the AF button 620 has been pressed, for example.

The operation section 600 may have a configuration in which the AF button 620 is omitted, for example. In this case, the operation section 600 may output the full-time AF start signal to the focus control section 330 when the user has moved the zoom lever beyond the TELE end, for example. The operation section 600 may output the full-time AF stop signal to the focus control section 330 when the user has returned the zoom lever to the TELE end. According to the above configuration, since the user can control the position of the movable lens and the start/stop of the full-time AF operation, it is possible to prevent a situation in which the user must perform a complex operation.

Figure 5A:
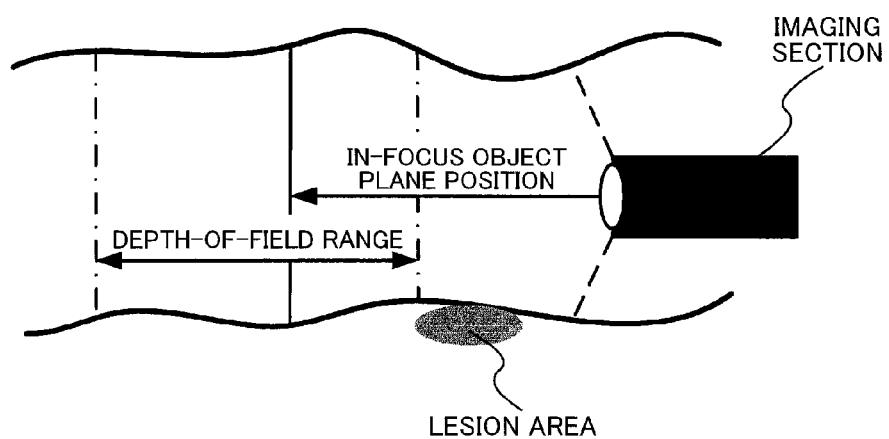
FIGS. 5A and 5B are views illustrating the relationship between the relative positional relationship between an imaging section and an object, an in-focus object plane position, and a depth-of-field range.
Figure 5B:
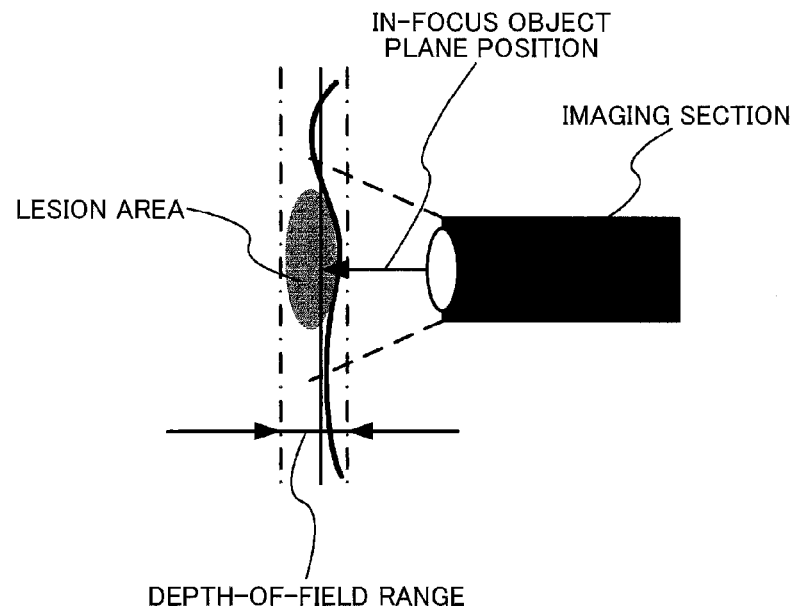

An operation performed by the user when performing normal observation and zoom observation is described below with reference to FIGS. 3, 5A, and 5B. The user moves the zoom lever 610 to the WIDE end, and performs normal observation for finding a lesion area (position A in FIG. 3). In this case, the imaging section 200 can acquire an image having a wide angle of view and a deep depth of field (see FIG. 5A). In this case, the depth-of-field range is about 10 to about 50 mm (see FIG. 3).

When the user has found a lesion area, the user zooms in on the lesion area while moving the imaging section 200 closer to the lesion area. In the first embodiment, when the distance to the lesion area has decreased to 10 mm or less, the lesion area lies outside the depth of field, and becomes out of focus. In this case, the user moves the zoom lever 610 toward the TELE end to bring the depth-of-field range close to the imaging section 200 (positions B and C in FIG. 3). Therefore, the lesion area lies within the depth of field again, and the user can continue observation of the lesion area.

In the first embodiment, the depth-of-field range is about 4 to about 7 mm (i e, a certain depth of field is maintained) even when the zoom lens has been moved to the position C. Therefore, the user can easily bring the lesion area into focus by operating the zoom lever 610, or adjusting the position of the imaging section 200.

The user then moves the zoom lever 610 toward the TELE end while moving the imaging section 200 closer to the lesion area to further zoom in on the lesion area. In the first embodiment, when the movable lens is positioned on the TELE side relative to the position D, the depth-of-field range is about 1 mm or less (see FIG. 3). In such a case, the user normally observes the object in a state in which the imaging section 200 is almost orthogonal to the wall surface of the digestive tract (i.e., object) (see FIG. 5B). Specifically, when the depth of field is shallow, only a narrow area of the image is brought into focus if the imaging section 200 is not orthogonal to the object.

In this case, it is difficult for the user to bring the object into focus by operating the zoom lever 610, or adjusting the position of the imaging section 200. Therefore, the user starts the full-time AF operation by pressing the AF button 620. Alternatively, the user starts the full-time AF operation by moving the zoom lever 610 beyond the TELE end. This makes it possible for the user to easily bring the object into focus.

The details of the focus control section 330 according to the first embodiment are described below with reference to FIG. 12 (flowchart), 13A, and 13B. The image sequentially output to the focus control section 330 from the magnification correction section 370 is hereinafter referred to as "current image".

When the AF start signal has been output from the control section 360, the focus control section 330 sets a counter wobCnt to 0, and sets a full-time AF start flag startFlag to 1 at a timing at which the current image has been acquired (S101). The focus control section 330 acquires the current position lensPosNow of the movable lens 240 from the lens control section 340. The focus control section 330 stands by until completion of acquisition of the image (S102). When the counter WobCnt is 0 (Yes in S103) and the full-time AF start flag startFlag is 1 (Yes in S104), the focus control section 330 sets the full-time AF start flag startFlag to 0, and sets the counter wobCnt to 1 (S105). The full-time AF start flag startFlag remains set to 0 thereafter. The focus control section 330 calculates the required lens position lensPosReq using the following expression (1). Note that wobLvl is the wobbling width of the movable lens 240 (see FIG. 13A). The focus control section 330 substitutes the required lens position lensPosReq for the wobbling center position LensPosCent.

$$lensPosReq=lensPosNow+wobLvl \qquad (1)$$

The focus control section 330 outputs the required lens position lensPosReq to the lens control section 340 (S106). The focus control section 330 outputs the required lens position lensPosReq and the wobbling center position LensPosCent to the magnification correction section 370, and returns to the step S102.

When the counter WobCnt is 1 (No in S103 and Yes in S107), the focus control section 330 acquires the contrast value contrastValNow of the current image at a timing at which the current image has been acquired, and stores the contrast value contrastValNow as contrastValOld (S108). For example, an arbitrary AF area may be set to the current image, a high-pass filter (HPF) process may be performed on the G signal of each pixel included in the AF area, and the sum of the output values may be set to be the contrast value contrastValNow. Note that the current image in this case is an image acquired when wobbling is performed in the direction in which the position of the movable lens increases (see FIG. 13A). The focus control section 330 sets the counter WobCnt to 2, and calculates the required lens position lensPosReq using the following expression (2) (S109). In this case, the focus control section 330 does not change the value of the wobbling center position LensPosCent.

$$lensPosReq=lensPosNow-2*wobLvl \qquad (2)$$

The focus control section 330 outputs the required lens position lensPosReq to the lens control section 340. The focus control section 330 outputs the required lens position lensPosReq and the wobbling center position lensPosCent to the magnification correction section 370 (S106).

When the counter WobCnt is 2 (No in S103 and No in S107), the focus control section 330 acquires the contrast value contrastValNow at a timing at which the current image has been acquired (S110). Note that the current image in this case is an image acquired when wobbling is performed in the direction in which the position of the movable lens decreases (see FIG. 13A). The focus control section 330 sets the counter WobCnt to 0, and calculates the required lens position lensPosReq using the following expression (3) (S111). In this case, the focus control section 330 does not change the value of the wobbling center position LensPosCent.

$$lensPosReq=lensPosNow+wobLvl \qquad (3)$$

The focus control section 330 outputs the required lens position lensPosReq to the lens control section 340. The focus control section 330 outputs the required lens position lensPosReq and the wobbling center position lensPosCent to the magnification correction section 370 (S106). Therefore, the position of the movable lens is returned to the wobbling center position.

When the counter WobCnt is 0 (Yes in S103), and the full-time AF start flag startFlag is 0 (No in S104), the focus control section 330 compares the acquired contrast value contrastValNow with the stored contrast value contrastValOld at a timing at which the current image has been acquired (S112). When the stored contrast value contrastValOld is larger than the acquired contrast value contrastValNow (Yes in S112), it is considered the in-focus lens position is situated in the direction in which the position of the movable lens increases. Therefore, the focus control section 330 sets the counter WobCnt to 1, and calculates the required lens position lensPosReq and the wobbling center position lensPosCent using the following expressions (4) and (5) (S113). Therefore, the wobbling center position is moved in the direction in which the position of the movable lens increases (see FIG. 13A).

$$lensPosReq=lensPosNow+wobLvl+shiftLvl \quad (4)$$

$$lensPosCent=lensPosNow+shiftLvl \quad (5)$$

The focus control section 330 outputs the required lens position lensPosReq to the lens control section 340. The focus control section 330 outputs the required lens position lensPosReq and the wobbling center position lensPosCent to the magnification correction section 370 (S106).

When the stored contrast value contrastValOld is smaller than the acquired contrast value contrastValNow (No in S112), it is considered the in-focus lens position is situated in the direction in which the position of the movable lens decreases. Therefore, the focus control section 330 sets the counter WobCnt to 1, and calculates the required lens position lensPosReq and the wobbling center position lensPosCent using the following expressions (6) and (7) (S114). Therefore, the wobbling center position is moved in the direction in which the position of the movable lens decreases.

$$lensPosReq=lensPosNow+wobLvl-shiftLvl \quad (6)$$

$$lensPosCent=lensPosNow-shiftLvl \quad (7)$$

The focus control section 330 outputs the required lens position lensPosReq to the lens control section 340. The focus control section 330 outputs the required lens position lensPosReq and the wobbling center position lensPosCent to the magnification correction section 370 (S106).

The focus control section 330 gradually brings the position of the movable lens close to the in-focus lens position by continuously performing the above operation, and the position of the movable lens finally reaches the in-focus lens position so that the object can be brought into focus. Even when the object has become out of focus due to a change in object distance or the like, the object can be brought into focus again by continuously performing the above operation. Therefore, the full-time AF operation can be implemented.

Figure 8A:
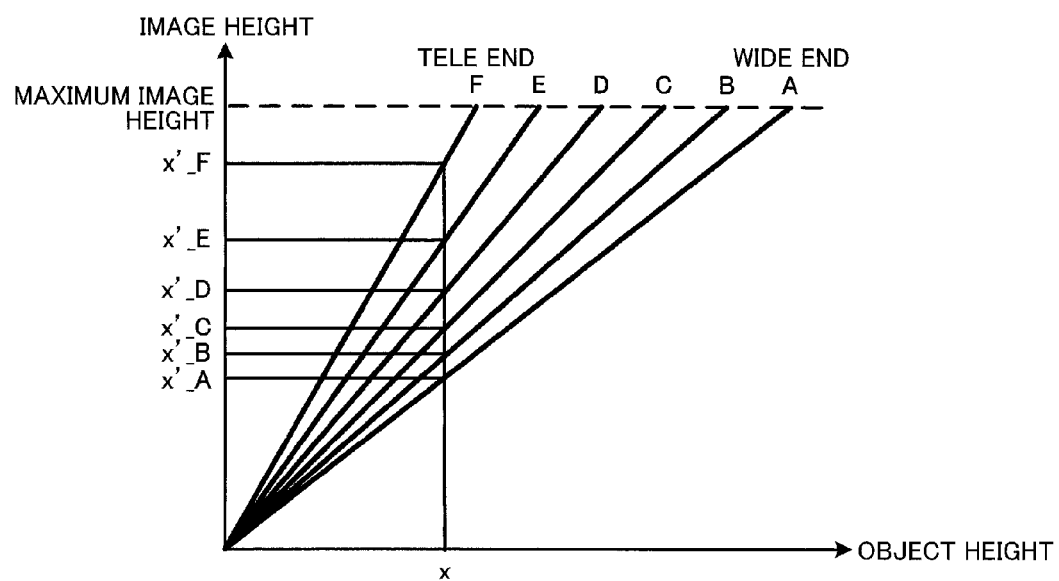
FIGS. 8A and 8B are views illustrating the relationship between a movable lens position, an object height, and an image height.

The concept of the magnification correction process performed by the magnification correction section 370 is described below. FIG. 8A is a schematic view illustrating the relationship between the object height (i.e., the distance from the optical axis in the object plane) and the image height (i.e., distance from the optical axis in the image plane) when the movable lens 240 is moved from the TELE end to the WIDE end in a state in which the object position (object distance) is set to an arbitrary fixed value. The maximum image height is a fixed value that is determined by the dimensions of the image sensor. As illustrated in FIG. 8A, the object height corresponding to the maximum image height increases (i.e., the angle of view increases) as the movable lens 240 moves from the TELE end to the WIDE end. When performing wobbling using such a movable lens 240, the position of the object in the image plane changes depending on whether the position of the movable lens 240 during wobbling is situated on the TELE side or the WIDE side relative to the wobbling center position. For example, the image height of the object positioned at the object height x is x'_TELE when the movable lens 240 is positioned on the TELE side, and is x' WIDE when the movable lens 240 is positioned on the WIDE side. As a result, the image flickers during wobbling. The magnification correction section 370 must perform the magnification correction process in order to prevent such a situation.

Since the range of the object corresponding to the AF area set by the focus control section 330 can be made equal when the movable lens 240 is positioned on the TELE side and when the movable lens 240 is positioned on the WIDE side by performing the magnification correction process on the image that has not been input to the focus control section 330, it is possible to improve the accuracy of the full-time AF operation.

The reference lens position setting process performed by the reference lens position setting section 380 is described below. In the first embodiment, it suffices to set a constant reference in one cycle of the wobbling operation, and it is desirable that the difference between the actual angle of view and the angle of view of the image obtained by the magnification correction process be small. Therefore, an arbitrary position between the TELE end and the WIDE end position in the processing target cycle of the wobbling operation can be set to be the reference lens position. For example, the setting process is facilitated by setting one of the wobbling center position, the TELE end, and the WIDE end to be the reference lens position.

However, when implementing the full-time AF operation that utilizes wobbling, the direction of the in-focus lens position cannot be determined without increasing the amount of wobbling when the amount of defocus of the image is large. When the amount of defocus of the image is small, an image that is defocused to a large extent and an image that is defocused to only small extent are alternately displayed (i.e., unnatural images are displayed) when the amount of wobbling is too large. Therefore, the amount of wobbling may be changed during the full-time AF operation. In this case, when the magnification correction process is performed using the position of the movable lens on the TELE side or the WIDE side during wobbling as the reference lens position, the angle of view of the image obtained by the magnification correction process changes when the amount of wobbling is changed, whereby an unnatural image is displayed. In the first embodiment, the magnification correction process is performed on the images acquired on the TELE side and the WIDE side during wobbling using the wobbling center position as the reference lens position. The following description is given taking an example in which the wobbling center position (lensPosCent) is used as the reference lens position. Note that the reference lens position is not limited thereto.

Figure 8B:
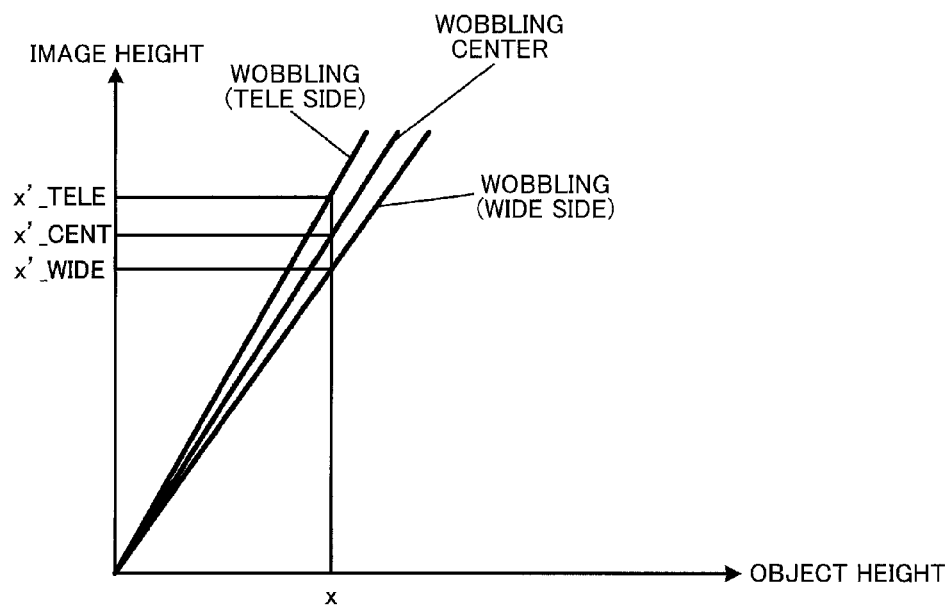

The details of the magnification correction process are described below on the assumption that the reference lens position has been set as described above. When the movable lens 240 is situated at the wobbling center position, the position of the object in the image plane is x'_CENT (see FIG. 8B). Therefore, the magnification correction process is performed on the image acquired on the TELE side so that the object positioned at the image height x'_TELE moves to the position x'_CENT. Specifically, a correction coefficient K is calculated using the following expression (8), and the magnification correction process is performed on the entire image by a factor of K.

$$K=x'\_CENT/x'\_TELE \quad (8)$$

When performing the magnification correction process on the image acquired on the WIDE side, the correction coefficient K is calculated using the following expression (9), and the magnification correction process is performed on the entire image by a factor of K.

$$K=x'\_CENT/x'\_WIDE \quad (9)$$

When the objective lens is designed so that the correction coefficient K is almost constant with respect to each image height from the optical center to the maximum image height, a highly accurate magnification correction process can be implemented over the entire image by performing the above process. When the amount of change in the correction coefficient K with respect to the image height is large, the correction coefficient may be calculated corresponding to the image height. The details of the magnification correction process are described later.

When the full-time AF operation is performed, the wobbling center position changes to approach the in-focus lens position. Therefore, the magnification correction section 370 must be able to implement a highly accurate magnification correction process irrespective of the wobbling center position.

Figure 6:
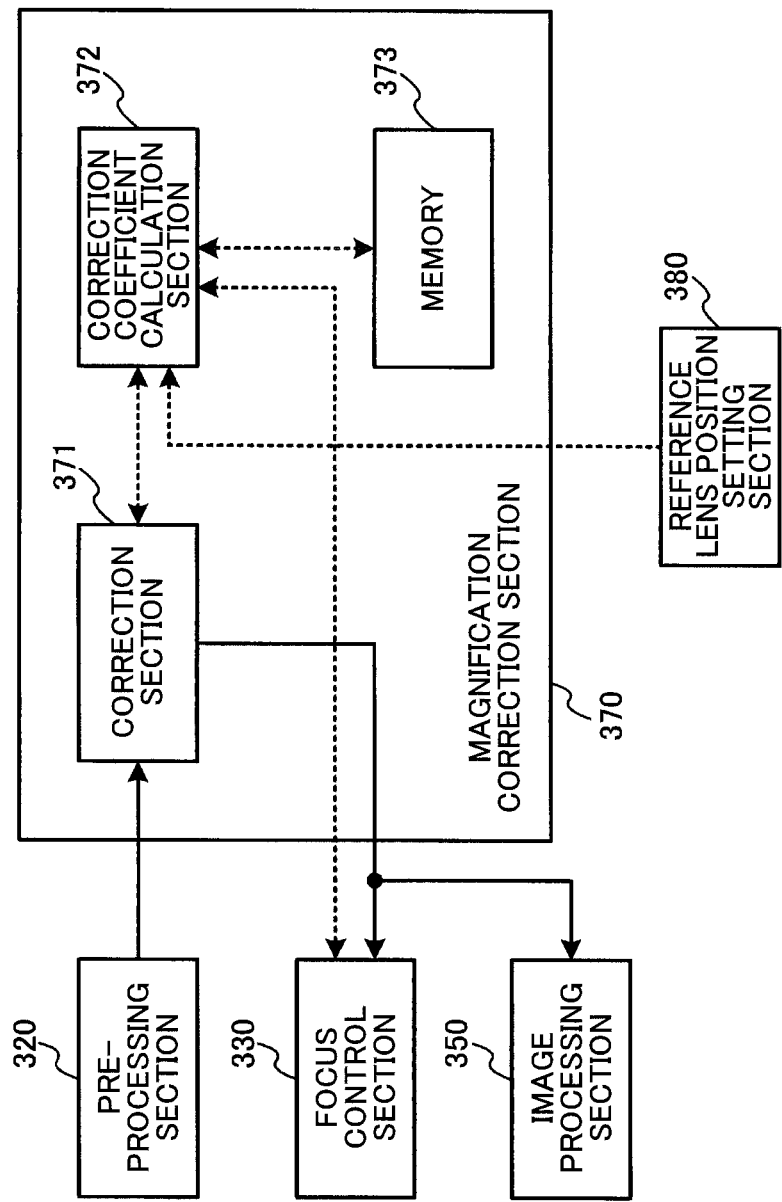
FIG. 6 illustrates a configuration example of a magnification correction section and a reference lens position setting section according to a first embodiment.

The details of the magnification correction section 370 according to the first embodiment are described below with reference to FIG. 6. The magnification correction section 370 includes a correction section 371, a correction coefficient calculation section 372, and a memory 373. The correction coefficient calculation section 372 calculates the correction coefficient K from the required lens position lensPosReq output from the focus control section 330, the reference lens position (e.g., lensPosCent) output from the reference lens position setting section 380, and correction coefficient calculation data stored in the memory 373, and outputs the calculated correction coefficient K to the correction section 371. The correction section 371 performs a correction process on the image output from the preprocessing section 320 using the correction coefficient K output from the correction coefficient calculation section 372, and outputs the image obtained by the correction process to the focus control section 330 and the image processing section 350.

Figures 14, 15:
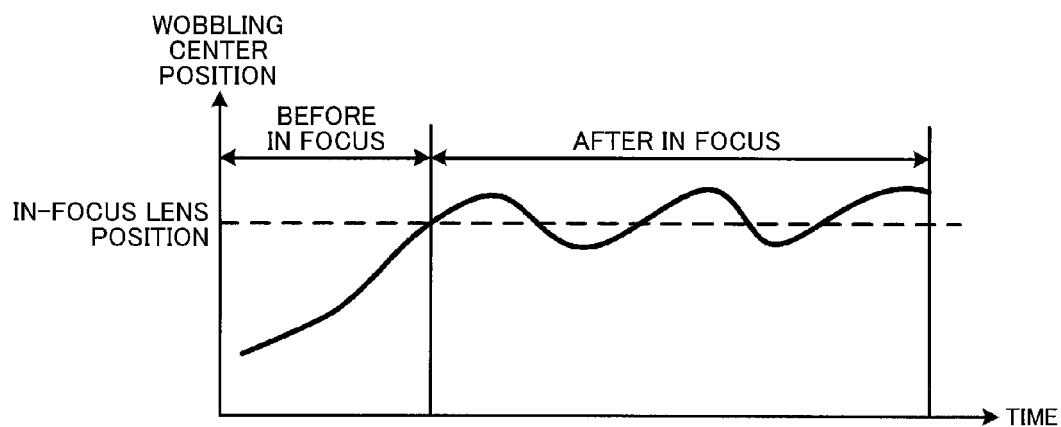
FIG. 14 is a view illustrating a change in center position around an in-focus lens position.
FIG. 15 illustrates an example of a data structure that links a movable lens position and an image height.

The correction coefficient calculation section 372 calculates the correction coefficient K as described below. FIG. 15 illustrates an example of the correction coefficient calculation data stored in the memory 373. The memory 373 sores a plurality of movable lens positions A to F from the TELE end to the WIDE end, and the image heights x'\_A to x'\_F of the object at the respective movable lens positions. For example, the relationship between the object height and the image height corresponding to each position of the movable lens 240 (see FIG. 8A) may be calculated from the objective lens design data, and the image heights x'\_A to x'\_F may be determined using an arbitrary object height x.

Figure 9:
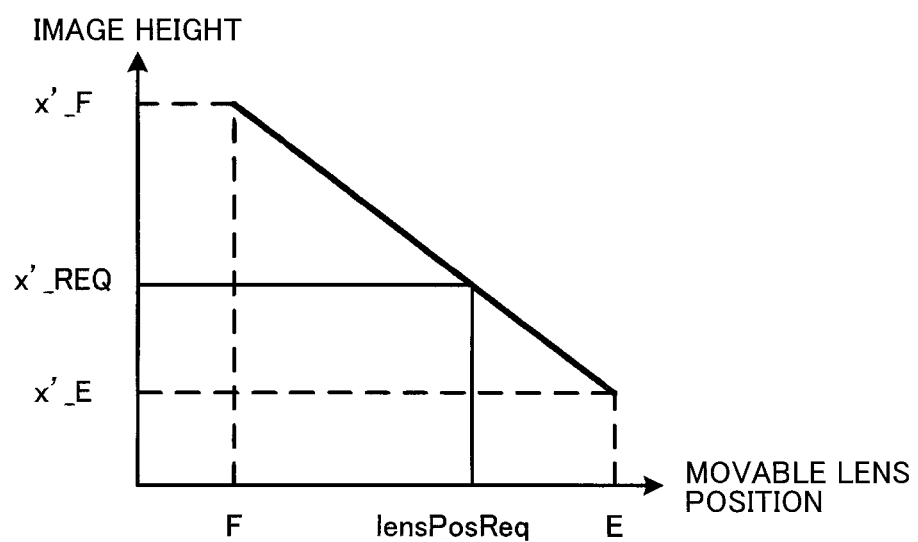
FIG. 9 illustrates an example in which the relationship between a movable lens position and an image height is calculated by an interpolation process.

In the first embodiment, when the full-time AF operation is performed, the required lens position lensPosReq is sequentially output from the focus control section 330, and the wobbling center position lensPosCent is sequentially output from the reference lens position setting section 380. The correction coefficient calculation section 372 calculates the image height x'\_REQ when the movable lens 240 is situated at the required lens position lensPosReq. For example, two movable lens positions among the movable lens positions A to F that are situated on either side of the required lens position lensPosReqs are detected (e.g., the required lens position lensPosReqs is situated between the movable lens positions E and F), and the image height x'\_REQ is calculated from the two movable lens positions and the image heights (e.g., x'\_E and x'\_F) corresponding thereto using linear interpolation illustrated in FIG. 9. The correction coefficient calculation section 372 then calculates the image height x'\_CENT when the movable lens 240 is situated at the wobbling center position lensPosCent in the same manner as the image height x'\_REQ. The correction coefficient calculation section 372 calculates the correction coefficient K using the following expression (10), and sequentially outputs the calculated correction coefficient K to the correction section 371.

$$K=x'\_CENT/x'\_REQ \quad (10)$$

Figure 10A:
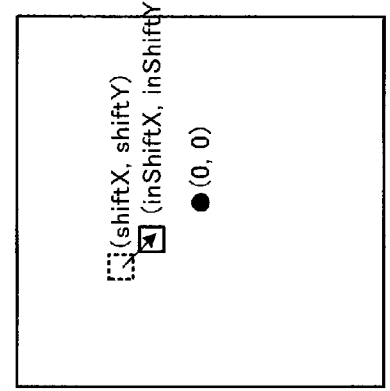
FIGS. 10A to 10D are views illustrating a magnification correction process.
Figure 10B:
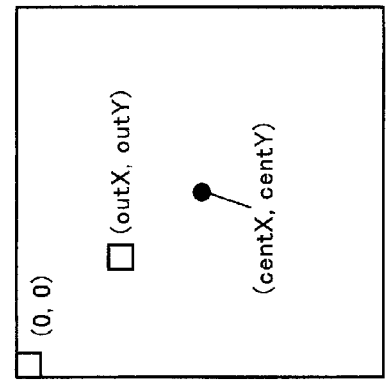

The details of the correction process performed by the correction section 371 are described below. The correction section 371 acquires the coordinates (outX, outY) of the attention pixel (pixel value calculation target pixel) of the image obtained by the correction process. Note that the coordinates (outX, outY) are values when the upper left pixel is the origin (see FIG. 10A). The correction section 371 converts the coordinates of the attention pixel (outX, outY) into coordinates (shiftX, shiftY) when the center of the image (i.e., the point of the image corresponding to the optical axis) is the origin (see FIG. 10B) using the following expressions (11) and (12). Note that (centX, centY) indicate the coordinates of the center of the image.

$$shiftX=outX-centX \quad (11)$$

$$shiftY=outY-centY \quad (12)$$

Figure 10C:
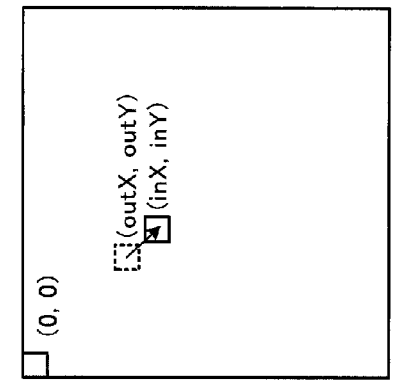

The correction section 371 then calculates coordinates (inShiftX, inShiftY) of the image before the correction process corresponding to the coordinates (shiftX, shiftY) using the following expressions (13) and (14). Note that the coordinates (inShiftX, inShiftY) are values when the center of the image is the origin. FIG. 10C illustrates the relationship between the coordinates (shiftX, shiftY) and the coordinates (inShiftX, inShiftY) when the correction coefficient K is larger than 1

$$inShiftX=shiftX/K \quad (13)$$

$$inShiftY=shiftY/K \quad (14)$$

The correction section 371 then converts the calculated coordinates (inShiftX, inShiftY) into coordinates (inX, inY) when the upper left pixel of the image is the origin using the following expressions (15) and (16). The coordinates (inX, inY) are the coordinates of the image before the scaling process corresponding to the coordinates (outX, outY) of the attention pixel after the correction process.

$$inX=inShiftX+centX \quad (15)$$

$$inY=inShiftY+centY \quad (16)$$

Therefore, when the correction coefficient K is larger than 1, the coordinates (inX, inY) are situated close to the center of the image as compared with the coordinates (outX, outY) (see FIG. 10C). When the correction coefficient K is smaller than 1, the coordinates (inX, inY) are situated away from the center of the image as compared with the coordinates (outX, outY).

Figure 11:
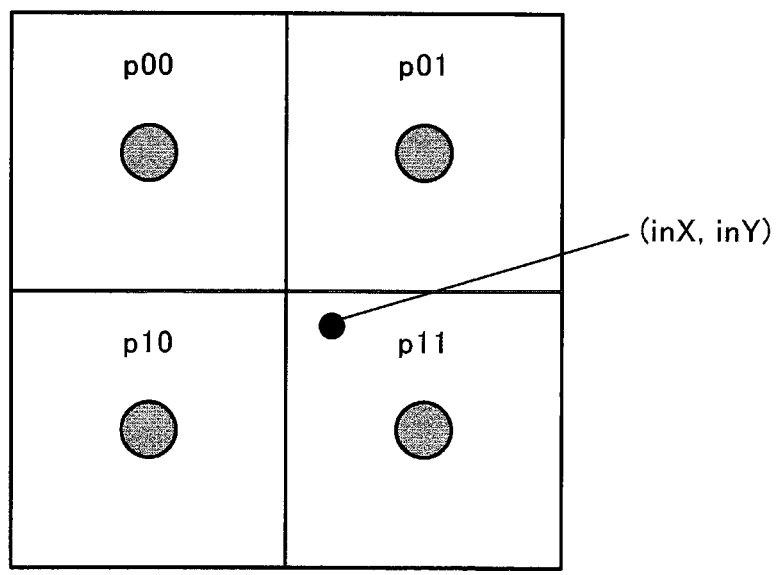
FIG. 11 is a view illustrating an interpolation process during a magnification correction process.

The correction section 371 calculates the pixel value I(outX, outY) of the attention pixel (outX, outY) after the correction process from the calculated coordinates (inX, inY) of the image before the correction process. For example, the pixel value of the attention pixel is calculated using an interpolation process (e.g., bilinear method). Specifically, the pixel value I(outX, outY) is calculated by the following expression (17) using the pixel values p00, p01, p10, and p11 of four pixels of the image before the correction process that are situated around the coordinates (inX, inY) (see FIG. 11).

Note that the pixel value I(outX, outY) can also be calculated using another known interpolation process.

$$I(outX, outY) = (\text{floor}(inX) + 1 - inX) * (\text{floor}(inY) + 1 - inY) * p00 + \quad (17)$$
$$(\text{floor}(inX) + 1 - inX) * (inY - \text{floor}(inY)) * p10 +$$
$$(inX - \text{floor}(inX)) * (\text{floor}(inY) + 1 - inY) * p01 +$$
$$(inX - \text{floor}(inX)) * (inY - \text{floor}(inY)) * p11$$

When the correction coefficient K is smaller than 1, the coordinates (inX, inY) are situated away from the center of the image as compared with the coordinates (outX, outY). Therefore, when the coordinates (outX, outY) are situated in the vicinity of the edge of the image, the coordinates (inX, inY) may be situated outside the image, and it may be impossible to calculate the pixel value I(outX, outY) after the correction process. In this case, an allowance area may be provided in advance outside an effective area used as an image (see FIG. 10D), and the pixel value I(outX, outY) may be calculated using the pixel value within the allowance area.

The correction section 371 performs the magnification correction process on the image sequentially output from the preprocessing section 320 on an RGB channel basis, and sequentially outputs the resulting image to the focus control section 330 and the image processing section 350. As a result, the images acquired on the TELE side and the WIDE side during wobbling are corrected as if the images were acquired at the wobbling center position (see FIG. 13B), and a natural image that does not flicker due to wobbling can be displayed on the display section 400.

Since it is considered that the user normally performs the full-time AF operation when the movable lens is positioned in the vicinity of the TELE end, only the lens positions D to F and the image heights x'_D to x'_F corresponding thereto may be stored in the memory 373, and the focus control section 330 perform the full-time AF operation while controlling the movable lens 240 within the above range.

As another modification, the imaging device may include a distance measurement section that calculates the distance to the object using the in-focus lens position after the AF process. Since the in-focus object plane position corresponding to the focus lens position is uniquely determined from the optical characteristics, the in-focus object plane position can be calculated when it has been determined that the focus lens position is a given position. Since the focus lens position after the AF process has normally ended is the in-focus lens position at which the imaging target object is expected to be in focus, it is estimated that the object is situated at a position corresponding to the in-focus object plane position. Therefore, the distance measurement section may store table data that indicates the relationship between the in-focus lens position and the in-focus object plane position in a memory, and calculate the in-focus object plane position from the in-focus lens position after the AF process using this table data to determine the distance to the object, for example.

Specifically, distance information that indicates the distance to the object can be calculated using the AF results (particularly the focus lens position). The acquired distance information may be used for an arbitrary process. For example, the structure of the object or the like may be estimated from the distance information, and an enhancement process that improves visibility may be performed on a specific irregular (uneven) structure, or an alert may be displayed (output) when the distance indicated by the distance information is smaller than a given threshold value since the imaging section may come in contact with tissue (object).

According to the first embodiment, the imaging device includes the objective lens 230 that includes the movable lens 240 that is configured so that the in-focus object plane position is changed along with a change in angle of view, the image sensor 260 that photoelectrically converts an object image formed by the objective lens 230 to acquire an image, the focus control section 330 that implements the full-time autofocus (AF) operation by controlling the position of the movable lens 240, the reference lens position setting section 380 that sets the reference lens position that is the reference position of the movable lens 240 during the full-time AF operation, and the magnification correction section 370 that performs the magnification correction process on the image based on the reference lens position and the position of the movable lens (see FIGS. 1 and 16). The reference lens position setting section 380 sets the reference lens position based on the moving range of the movable lens during the wobbling operation used for the full-time AF operation, and the magnification correction section 370 performs the magnification correction process that reduces a change in angle of view of the image due to a change in position of the movable lens during the wobbling operation relative to the reference lens position.

Figure 12:
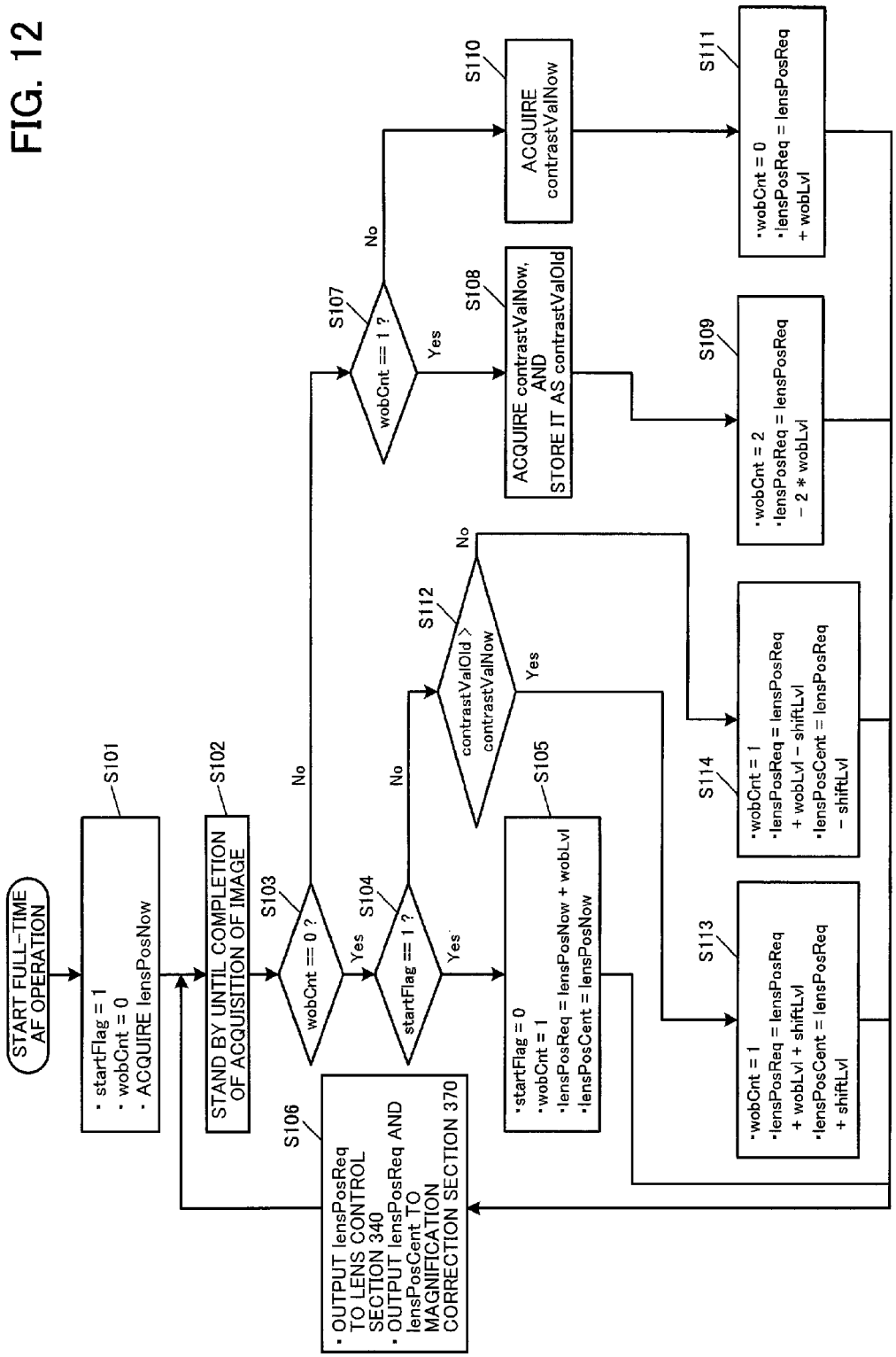
FIG. 12 is a flowchart illustrating a wobbling operation.

The full-time AF operation refers to an operation (control) that moves the movable lens 240 through the wobbling operation, and compares the contrast values calculates from the images acquired at the respective movable lens positions to bring the position of the movable lens 240 close to the in-focus lens position (i.e., the lens position in an in-focus state) (see FIG. 12 (flowchart), 13A, and 13B).

According to the above configuration, since the magnification correction process that compensates for a change in position of the movable lens 240 relative to the reference lens position is performed, it is possible to reduce (ideally cancel) the movement of the movable lens 240 due to the wobbling operation within the image even when the wobbling operation is performed (see A1 and A2 in FIG. 13A). Specifically, since the AF evaluation value can be stably calculated by calculating the AF evaluation value (e.g., contrast value) using the image obtained by the magnification correction process, it is possible to implement the AF control process with high accuracy. Moreover, since a frequent change in angle of view can be suppressed, it is possible to provide an image that can be easily observed by the user. This is very useful in the field of endoscopes in which a lesion area is observed, for example.

The reference lens position setting section 380 may set the reference lens position based on the center position (lensPos-Cent) of the movable lens 240 during the wobbling operation, the farthest point (lensPosCent+wobLvl) that indicates the telescopic-side end point during the wobbling operation, or the nearest point (lensPosCent−wobLvl) that indicates the wide-angle-side end point during the wobbling operation.

The above configuration makes it possible to easily set a constant reference lens position within one cycle of the wobbling operation. Since the center position and the wobbling width are set by the focus control section 330, and can be easily acquired, the center position, the farthest point, and the nearest point can be acquired without performing a complex process.

The reference lens position setting section 380 may set the center position of the movable lens 240 during the wobbling operation to be the reference lens position.

Figure 17:
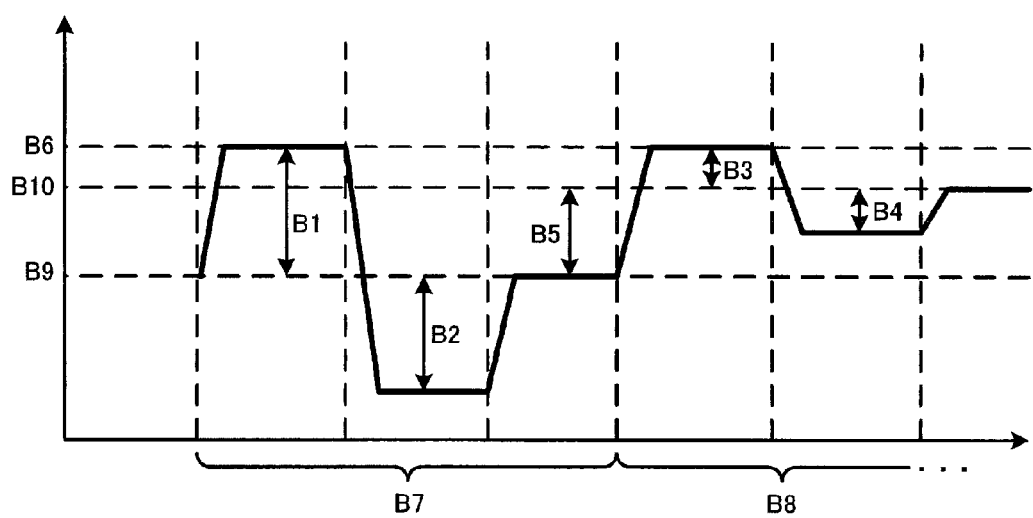
FIG. 17 is a view illustrating the effects achieved when a center position is used as a reference lens position.

The above configuration makes it possible to easily set the reference lens position since the center position (lensPos-Cent) can be used as the reference lens position. The farthest point and the nearest point vary depending on the wobbling width (wobLvl), and the wobbling width may be changed between a given wobbling cycle and another wobbling cycle. In this case, a problem may occur. FIG. 17 illustrates an extreme example. In FIG. 17, the wobbling operation is performed in a first wobbling cycle B7 using a large wobbling width (see B1 and B2), and the center position is shifted by the shift level indicated by B5 in the direction in which the position of the movable lens 240 increases. The wobbling operation is performed in a second wobbling cycle B8 using a small wobbling width (see B1 and B2) and the shifted center position. In this case, when the farthest point is used as the reference lens position, the position indicated by B6 is used as the reference lens position in the first wobbling cycle B7 and the second wobbling cycle B8. However, since the center position that has been shifted in the direction in which the position of the movable lens 240 increases (see B5) is not reflected in the image, the user may be confused. When the center position is used as the reference lens position, the position indicated by B9 is used as the reference lens position in the first wobbling cycle B7, and the position indicated by B10 is used as the reference lens position in the second wobbling cycle B8. Therefore, the shift in the center position (see B5) can be reflected in the reference lens position (and the angle of view of the image obtained by the magnification correction process).

The focus control section 330 may perform a first wobbling operation that moves the movable lens 240 around a first position within a first wobbling width as the wobbling operation in a first wobbling cycle to implement a first AF process, and perform a second wobbling operation that moves the movable lens 240 around a second position within a second wobbling width as the wobbling operation in a second wobbling cycle to implement a second AF process, the second position being set based on a result of the first AF process, and the second wobbling cycle being a wobbling cycle subsequent to the first wobbling cycle. In this case, the reference lens position setting section 380 may set a first reference lens position to be the reference lens position in the first wobbling cycle based on the moving range of the movable lens 240 during the first wobbling operation, and set a second reference lens position to be the reference lens position in the second wobbling cycle based on the moving range of the movable lens 240 during the second wobbling operation.

The above configuration makes it possible to set the reference lens position corresponding to the position of the movable lens 240 in each wobbling cycle. Since the reference lens position is set in each wobbling cycle, it is possible to appropriately reflect the shift indicated by A5 in FIG. 13A (i.e., global control of the movable lens 240 during the full-time AF operation) in the image while suppressing the effects on the angle of view due to the small movement of the movable lens 240 (see A1 to A4). This makes it possible to provide an image that is easy to observe to the user, and suppress a situation in which the performance of the image sensor cannot be sufficiently utilized (see above).

The magnification correction section 370 may output an output image as an output of the magnification correction process, the output image having a number of pixels smaller than that of the image acquired by the image sensor 260.

When the center area of the image acquired by the image sensor 260 is set to be an effective area, and the peripheral area of the image other than the effective area is set to be an allowance area, the magnification correction section 370 may generate the output image based on the effective area when performing a magnification process as the magnification correction process, and generate the output image based on the effective area and the allowance area when performing a demagnification process as the magnification correction process.

Figure 10D:
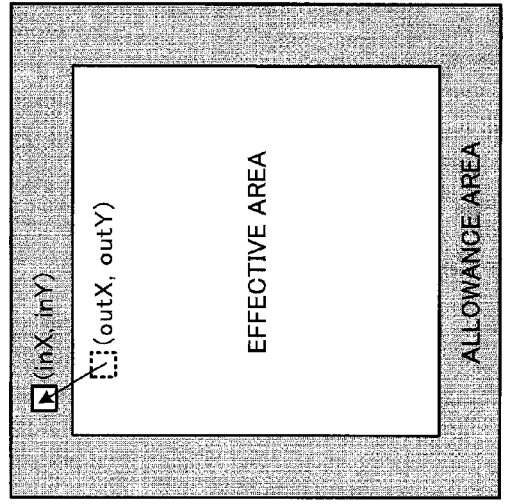

The above configuration makes it possible to appropriately assign information to each pixel of the output image even when the demagnification process is performed as the magnification correction process (see FIG. 10D). When performing the demagnification process, the output value of a given pixel is determined using the pixel value of the pixel situated on the peripheral side as compared with the given pixel (see FIG. 10D). Therefore, a peripheral pixel corresponding to (inX, inY) may not be present, and it may be impossible to acquire information about the the peripheral area of the output image. However, when the peripheral area of the captured image is set to be the allowance area in advance, it is possible to prevent a situation in which the information about the output image is missing by utilizing the pixels in the allowance area during the demagnification process. Note that the upper limit and the lower limit of the coefficient (K) used for the magnification correction process are determined by the wobbling width, and the wobbling width is not normally set to a very large value. Specifically, since the ratio of the effective area to the entire captured image can be increased even when a sufficient allowance area is provided, it is not likely that the number of pixels of the image obtained by the magnification correction process is significantly small with respect to the performance of the image sensor (i.e., the number of pixels of the image sensor).

The magnification correction section 370 may output the image obtained by the magnification correction process to the focus control section 330, and the focus control section 330 may implement the full-time AF operation based on the image obtained by the magnification correction process that has been output from the magnification correction section 370.

According to the above configuration, since the full-time AF operation (contrast value calculation in a narrow sense) can be implemented using the image obtained by the magnification correction process, it is possible to implement the AF control process with high accuracy. Specifically, since the magnification correction process is a process that reduces a change in angle of view, a change in contrast value calculation reference between the comparison target images (e.g., a shift in equal edge toward the high-frequency side or the low-frequency side, or a change in object range included in the AF area that is the contrast value calculation target) can be suppressed by utilizing the results of the magnification correction process, and the contrast value comparison process can be accurately performed.

When the telescopic-side end position of the movable lens 240 within the movable range of the movable lens 240 is the telescopic end, and the wide-angle-side end position of the movable lens 240 within the movable range of the movable lens 240 is the wide-angle end, the focus control section 330 may implement the full-time AF operation when the movable lens 240 is situated between the telescopic end and a given position that is arbitrarily set between the wide-angle end and the telescopic end.

The above configuration makes it possible to implement the full-time AF operation when the movable lens 240 is situated on the telescopic side relative to the given position. The AF operation is particularly effective when it is difficult to manually bring the object into focus (e.g., during zoom observation in which the depth-of-field range is small (shallow)). Specifically, it is possible to implement an efficient focus control process by implementing the full-time AF operation when the movable lens 240 is situated on the telescopic side.

The imaging device may include the operation section 600 that includes a zoom lever (e.g., zoom lever 610 illustrated in FIG. 4) that allows the user to adjust the position of the movable lens 240, and the focus control section 330 may at least start or stop the full-time AF operation based on the operation performed by the user on the zoom lever.

The above configuration makes it possible to start or stop the full-time AF operation based on an explicit operation performed by the user. It may be useful to automatically start the AF operation when the AF operation is effective. However, the operation performed by the user may be hindered when the AF operation has unintentionally started. Therefore, it may be useful to employ an interface that starts or stops the AF operation based on the operation performed by the user.

When the telescopic-side end position of the movable lens 240 within the movable range of the movable lens 240 is the telescopic end, and the wide-angle-side end position of the movable lens 240 within the movable range of the movable lens 240 is the wide-angle end, the focus control section 330 may start the full-time AF operation when the user has performed an operation that moves the zoom lever 610 to the telescopic end lever position corresponding to the telescopic end, and has performed an operation that moves the zoom lever 610 beyond the telescopic end lever position.

The above configuration makes it possible to implement an AF start operation that utilizes the zoom lever 610. As described above, the operation performed by the user may be hindered when the AF operation has unintentionally started. In this case, it is necessary to avoid a situation in which a normal operation that is performed irrespective of the AF operation triggers the AF operation. Therefore, it is effective to employ a configuration in which the AF operation is triggered by an operation that is not normally performed (i.e., an operation that moves the zoom lever 610 to the lever position corresponding to the telescopic end, and moves the zoom lever 610 beyond the lever position corresponding to the telescopic end). In this case, since the AF button 620 illustrated in FIG. 4 can be omitted, the configuration of the operation section 600 can be simplified.

Note that part or most of the processes performed by the imaging device and the like according to the first embodiment may be implemented by a program. In this case, the imaging device and the like according to the first embodiment are implemented by causing a processor (e.g., CPU) to execute the program. Specifically, a program stored in a non-transitory information storage device is read from the information storage device, and a processor (e.g., CPU) executes the program read from the information storage device. The information storage device (computer-readable device) stores a program, data, and the like. The function of the information storage device may be implemented by an optical disk (e.g., DVD or CD), a hard disk drive (HDD), a memory (e.g., memory card or ROM), or the like. The processor (e.g., CPU) performs various processes according to the first embodiment based on a program (data) stored in the information storage device. Specifically, a program that causes a computer (i.e., a device including an operation section, a processing section, a storage section, and an output section) to function as each section according to the first embodiment (i.e., a program that causes a computer to execute the process implemented by each section) is stored in the information storage device.

The first embodiment may also be applied to a method for controlling an imaging device (method for operating an imaging device) that includes acquiring an image obtained by photoelectrically converting an object image formed by the objective lens 230 that includes the movable lens 240 that is configured so that the in-focus object plane position is changed along with a change in angle of view, setting the reference lens position that is the reference position of the movable lens 240 during the full-time autofocus (AF) operation based on the moving range of the movable lens during the wobbling operation used for the full-time AF operation, and performing the magnification correction process on the image based on the reference lens position and the position of the movable lens 240, the magnification correction process reducing a change in angle of view of the image due to a change in position of the movable lens 240 during the wobbling operation relative to the reference lens position.

3. Second Embodiment

An endoscope system that includes an imaging device according to a second embodiment is described below. The endoscope system according to the second embodiment differs from the endoscope system according to the first embodiment as to the reference lens position setting section 380.

Figure 7:
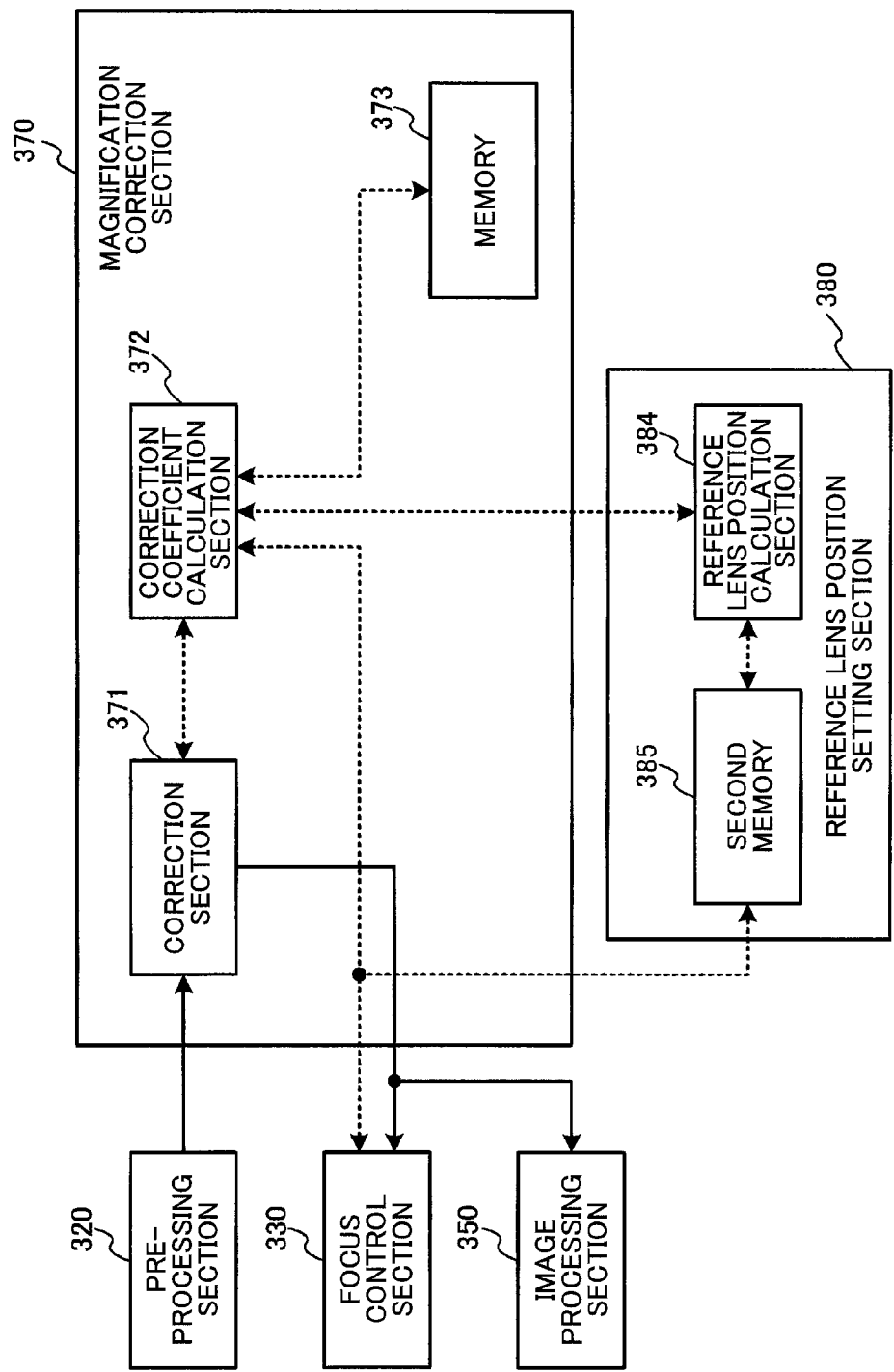
FIG. 7 illustrates a configuration example of a magnification correction section and a reference lens position setting section according to a second embodiment.

The details of the reference lens position setting section 380 (and the magnification correction section 370) according to the second embodiment are described below with reference to FIG. 7. The reference lens position setting section 380 includes a reference lens position calculation section 384 and a second memory 385. In the second embodiment, the wobbling center position lensPosCent sequentially output from the focus control section 330 is stored in the second memory 385. The current wobbling center position lensPosCent, and N wobbling center positions lensPosCent output prior to the current wobbling center position lensPosCent are stored in the second memory 385. The reference lens position calculation section 384 calculates a target reference lens position lensPosTarget used for the magnification correction process from a plurality of wobbling center positions lensPosCent stored in the second memory 385, and sequentially outputs the target reference lens position lensPosTarget to the correction coefficient calculation section 372. Specifically, the reference lens position calculation section 384 calculates the average value of the wobbling center positions lensPosCents stored in the second memory 385 as the target reference lens position lensPosTarget.

The correction coefficient calculation section 372 calculates the correction coefficient K using the required lens position lensPosReq sequentially output from the focus control section 330 and the target reference lens position lensPosTarget sequentially output from the reference lens position calculation section 384, and outputs the calculated correction coefficient K to the correction section 371. For example, the correction coefficient calculation section 372 calculates the correction coefficient K in the same manner as described above in connection with the first embodiment using the target reference lens position lensPosTarget instead of the wobbling center position lensPosCent. The correction section 371 performs the magnification correction process in the same manner as described above in connection with the first embodiment.

As described above in connection with the first embodiment, the wobbling center position always changes toward the WIDE side or the TELE side during the full-time AF operation so as to approach the in-focus lens position. Therefore, the wobbling center position moves toward the WIDE side and the TELE side across the in-focus lens position even after an in-focus state has been achieved (see FIG. 14). When the amplitude of the wobbling center position is large, the angle of view of the image obtained by the magnification correction process changes along with the movement (change) of the wobbling center position (i.e., an unnatural image is obtained) even when the magnification correction process has been accurately performed using the wobbling center position as the target. A natural image in which a change in angle of view is small even after an in-focus state has been achieved can be implemented by by utilizing the target reference lens position lensPosTarget that changes to only a small extent as compared with the wobbling center position lensPosCent as the target used for the magnification correction process.

According to the second embodiment, the reference lens position setting section 380 included in the imaging device sets a position calculated by averaging the wobbling center position of the movable lens 240 during the wobbling operation to be the reference lens position.

The above configuration makes it possible to set an appropriate reference lens position even when the wobbling center position is close to the in-focus lens position (see FIG. 14). When implementing the full-time AF operation, the center position is moved by the shift level after the wobbling cycle has ended unless the AF operation is intentionally stopped. Therefore, the center position may change around the in-focus lens position when the center position is close to the in-focus lens position. In this case, when the center position is used as the reference lens position, the angle of view of the image acquired by the magnification correction process also changes corresponding to the reference lens position. Since the average value of the center positions in a cycle longer than the above change cycle is considered to be close to the in-focus lens position, it is possible to reduce a change in angle of view of the image obtained by the magnification correction process.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. An imaging device comprising:
    an objective lens that includes a movable lens that is configured so that an in-focus object plane position is changed along with a change in angle of view;
    an image sensor that photoelectrically converts an object image formed by the objective lens to acquire an image;
    a focus control section that implements an autofocus (AF) operation by controlling a position of the movable lens;
    a reference lens position setting section that sets a reference lens position based on a moving range of the movable lens during a wobbling operation, the reference lens position being a reference position of the movable lens, and the wobbling operation being performed every given cycle during the AF operation; and
    a magnification correction section that performs a magnification correction process that reduces a change in the angle of view of the image due to a change in the position of the movable lens during the wobbling operation relative to the reference lens position;
    wherein the focus control section performing a first wobbling operation that moves the movable lens around a first position within a first wobbling width as the wobbling operation in a first wobbling cycle to implement a first AF process, and performing a second wobbling operation that moves the movable lens around a second position within a second wobbling width as the wobbling operation in a second wobbling cycle to implement a second AF process, the second position being set based on a result of the first AF process, and the second wobbling cycle being a wobbling cycle subsequent to the first wobbling cycle.

2. The imaging device as defined in claim 1, wherein the reference lens position setting section setting the reference lens position based on a center position of the movable lens during the wobbling operation, a farthest point that indicates a telescopic-side end point during the wobbling operation, or a nearest point that indicates a wide-angle-side end point during the wobbling operation.

3. The imaging device as defined in claim 1, wherein the reference lens position setting section setting a center position of the movable lens during the wobbling operation to be the reference lens position.

4. The imaging device as defined in claim 1, wherein the reference lens position setting section setting a position calculated by averaging a center position of the movable lens during the wobbling operation to be the reference lens position.

5. The imaging device as defined in claim 1, wherein the reference lens position setting section setting a first reference lens position to be the reference lens position in the first wobbling cycle based on the moving range of the movable lens during the first wobbling operation, and setting a second reference lens position to be the reference lens position in the second wobbling cycle based on the moving range of the movable lens during the second wobbling operation.

6. The imaging device as defined in claim 1, wherein the magnification correction section outputting an output image as an output of the magnification correction process, the output image having a number of pixels smaller than that of the image acquired by the image sensor.

7. The imaging device as defined in claim 6, wherein
    a center area of the image acquired by the image sensor being set to be an effective area, and a peripheral area of the image other than the effective area being set to be an allowance area, and
    the magnification correction section generating the output image based on the effective area when performing a magnification process as the magnification correction process, and generating the output image based on the effective area and the allowance area when performing a demagnification process as the magnification correction process.

8. The imaging device as defined in claim 1, wherein
    the magnification correction section outputting the image obtained by the magnification correction process to the focus control section, and
    the focus control section implementing the AF operation based on the image obtained by the magnification correction process that has been output from the magnification correction section.

9. The imaging device as defined in claim 1, wherein
    a telescopic-side end position of the movable lens within the movable range of the movable lens being a telescopic end, and a wide-angle-side end position of the movable lens within the movable range of the movable lens being a wide-angle end, and
    the focus control section implementing the AF operation when the movable lens is situated between the telescopic end and a given position that is arbitrarily set between the wide-angle end and the telescopic end.

10. The imaging device as defined in claim 1, further comprising:

an operation section that includes a zoom lever that allows a user to adjust the position of the movable lens, the focus control section at least starting or stopping the AF operation based on an operation performed by the user on the zoom lever.

11. The imaging device as defined in claim 10, wherein a telescopic-side end position of the movable lens within the movable range of the movable lens being a telescopic end, and a wide-angle-side end position of the movable lens within the movable range of the movable lens being a wide-angle end, and the focus control section starting the AF operation when the user has performed an operation that moves the zoom lever to a telescopic end lever position corresponding to the telescopic end, and has performed an operation that moves the zoom lever beyond the telescopic end lever position.

12. A method for controlling an imaging device comprising:

acquiring an image obtained by photoelectrically converting an object image formed by an objective lens that includes a movable lens that is configured so that an in-focus object plane position is changed along with a change in angle of view;

setting a reference lens position based on a moving range of the movable lens during a wobbling operation, the reference lens position being a reference position of the movable lens, and the wobbling operation being performed every given cycle during an autofocus (AF) operation; and performing a magnification correction process that reduces a change in the angle of view of the image due to a change in position of the movable lens during the wobbling operation relative to the reference lens position;

wherein the acquiring comprises performing a first wobbling operation that moves the movable lens around a first position within a first wobbling width as the wobbling operation in a first wobbling cycle to implement a first AF process, and performing a second wobbling operation that moves the movable lens around a second position within a second wobbling width as the wobbling operation in a second wobbling cycle to implement a second AF process, the second position being set based on a result of the first AF process, and the second wobbling cycle being a wobbling cycle subsequent to the first wobbling cycle.

13. An information storage device with an executable program stored thereon, wherein the program instructs a computer to perform steps of:

acquiring an image obtained by photoelectrically converting an object image formed by an objective lens that includes a movable lens that is configured so that an in-focus object plane position is changed along with a change in angle of view;

setting a reference lens position based on a moving range of the movable lens during a wobbling operation, the reference lens position being a reference position of the movable lens, and the wobbling operation being performed every given cycle during an autofocus (AF) operation; and performing a magnification correction process that reduces a change in the angle of view of the image due to a change in position of the movable lens during the wobbling operation relative to the reference lens position;

wherein the acquiring comprises performing a first wobbling operation that moves the movable lens around a first position within a first wobbling width as the wobbling operation in a first wobbling cycle to implement a first AF process, and performing a second wobbling operation that moves the movable lens around a second position within a second wobbling width as the wobbling operation in a second wobbling cycle to implement a second AF process, the second position being set based on a result of the first AF process, and the second wobbling cycle being a wobbling cycle subsequent to the first wobbling cycle.

14. An imaging device comprising:

an objective lens that includes a movable lens that is configured so that an in-focus object plane position is changed along with a change in angle of view;

an image sensor that photoelectrically converts an object image formed by the objective lens to acquire an image;

a focus control section that implements an autofocus (AF) operation by controlling a position of the movable lens;

a reference lens position setting section that sets a reference lens position based on a moving range of the movable lens during a wobbling operation, the reference lens position being a reference position of the movable lens, and the wobbling operation being performed every given cycle during the AF operation; and a magnification correction section that performs a magnification correction process that reduces a change in the angle of view of the image due to a change in the position of the movable lens during the wobbling operation relative to the reference lens position;

wherein the magnification correction section outputting an output image as an output of the magnification correction process, the output image having a number of pixels smaller than that of the image acquired by the image sensor;

a center area of the image acquired by the image sensor being set to be an effective area, and a peripheral area of the image other than the effective area being set to be an allowance area; and the magnification correction section generating the output image based on the effective area when performing a magnification process as the magnification correction process, and generating the output image based on the effective area and the allowance area when performing a demagnification process as the magnification correction process.

15. An imaging device comprising:

an objective lens that includes a movable lens that is configured so that an in-focus object plane position is changed along with a change in angle of view;

an image sensor that photoelectrically converts an object image formed by the objective lens to acquire an image;

a focus control section that implements an autofocus (AF) operation by controlling a position of the movable lens;

a reference lens position setting section that sets a reference lens position based on a moving range of the movable lens during a wobbling operation, the reference lens position being a reference position of the movable lens, and the wobbling operation being performed every given cycle during the AF operation; and a magnification correction section that performs a magnification correction process that reduces a change in the angle of view of the image due to a change in the position of the movable lens during the wobbling operation relative to the reference lens position;

wherein a telescopic-side end position of the movable lens within the movable range of the movable lens being a telescopic end, and a wide-angle-side end position of the movable lens within the movable range of the movable lens being a wide-angle end; and the focus control section implementing the AF operation when the movable lens is situated between the telescopic end and a given position that is arbitrarily set between the wide-angle end and the telescopic end.

16. An imaging device comprising:
an objective lens that includes a movable lens that is configured so that an in-focus object plane position is changed along with a change in angle of view;
an image sensor that photoelectrically converts an object image formed by the objective lens to acquire an image;
a focus control section that implements an autofocus (AF) operation by controlling a position of the movable lens;
a reference lens position setting section that sets a reference lens position based on a moving range of the movable lens during a wobbling operation, the reference lens position being a reference position of the movable lens, and the wobbling operation being performed every given cycle during the AF operation;
a magnification correction section that performs a magnification correction process that reduces a change in the angle of view of the image due to a change in the position of the movable lens during the wobbling operation relative to the reference lens position; and
an operation section that includes a zoom lever that allows a user to adjust the position of the movable lens;
wherein the focus control section at least starting or stopping the AF operation based on an operation performed by the user on the zoom lever;
a telescopic-side end position of the movable lens within the movable range of the movable lens being a telescopic end, and a wide-angle-side end position of the movable lens within the movable range of the movable lens being a wide-angle end; and
the focus control section starting the AF operation when the user has performed an operation that moves the zoom lever to a telescopic end lever position corresponding to the telescopic end, and has performed an operation that moves the zoom lever beyond the telescopic end lever position.

17. A method for controlling an imaging device comprising:
acquiring an image obtained by photoelectrically converting an object image formed by an objective lens that includes a movable lens that is configured so that an in-focus object plane position is changed along with a change in angle of view;
setting a reference lens position based on a moving range of the movable lens during a wobbling operation, the reference lens position being a reference position of the movable lens, and the wobbling operation being performed every given cycle during an autofocus (AF) operation; and
performing a magnification correction process that reduces a change in the angle of view of the image due to a change in position of the movable lens during the wobbling operation relative to the reference lens position; wherein
the magnification correction process outputs an output image as an output of the magnification correction process, the output image having a number of pixels smaller than that of the acquired image;
setting a center area of the acquired image to be an effective area, and setting a peripheral area of the image other than the effective area to be an allowance area, and the magnification correction process generating an output image based on the effective area when performing a magnification process as the magnification correction process, and generating the output image based on the effective area and the allowance area when performing a demagnification process as the magnification correction process.

18. A method for controlling an imaging device comprising:
acquiring an image obtained by photoelectrically converting an object image formed by an objective lens that includes a movable lens that is configured so that an in-focus object plane position is changed along with a change in angle of view;
setting a reference lens position based on a moving range of the movable lens during a wobbling operation, the reference lens position being a reference position of the movable lens, and the wobbling operation being performed every given cycle during an autofocus (AF) operation; and
performing a magnification correction process that reduces a change in the angle of view of the image due to a change in position of the movable lens during the wobbling operation relative to the reference lens position; wherein
a telescopic-side end position of the movable lens within the movable range of the movable lens being a telescopic end, and a wide-angle-side end position of the movable lens within the movable range of the movable lens being a wide-angle end, and
implementing the AF operation when the movable lens is situated between the telescopic end and a given position that is arbitrarily set between the wide-angle end and the telescopic end.

19. A method for controlling an imaging device comprising:
acquiring an image obtained by photoelectrically converting an object image formed by an objective lens that includes a movable lens that is configured so that an in-focus object plane position is changed along with a change in angle of view;
setting a reference lens position based on a moving range of the movable lens during a wobbling operation, the reference lens position being a reference position of the movable lens, and the wobbling operation being performed every given cycle during an autofocus (AF) operation;
performing a magnification correction process that reduces a change in the angle of view of the image due to a change in position of the movable lens during the wobbling operation relative to the reference lens position; and
allowing a user to adjust the position of the movable lens; wherein
starting or stopping the AF operation based on an operation performed by the user to adjust the position of the movable lens;
a telescopic-side end position of the movable lens within the movable range of the movable lens being a telescopic end, and a wide-angle-side end position of the movable lens within the movable range of the movable lens being a wide-angle end, and
starting the AF operation when the user has performed the operation to adjust the position of the movable lens to a telescopic position corresponding to the telescopic end, and has performed an operation to adjust the position of the movable lens beyond the telescopic position.

20. An information storage device with an executable program stored thereon, wherein the program instructs a computer to perform steps of:
- acquiring an image obtained by photoelectrically converting an object image formed by an objective lens that includes a movable lens that is configured so that an in-focus object plane position is changed along with a change in angle of view;
- setting a reference lens position based on a moving range of the movable lens during a wobbling operation, the reference lens position being a reference position of the movable lens, and the wobbling operation being performed every given cycle during an autofocus (AF) operation; and
- performing a magnification correction process that reduces a change in the angle of view of the image due to a change in position of the movable lens during the wobbling operation relative to the reference lens position; wherein
- the magnification correction process outputs an output image as an output of the magnification correction process, the output image having a number of pixels smaller than that of the acquired image;
- setting a center area of the acquired image to be an effective area, and setting a peripheral area of the image other than the effective area to be an allowance area, and
- the magnification correction process generating an output image based on the effective area when performing a magnification process as the magnification correction process, and generating the output image based on the effective area and the allowance area when performing a demagnification process as the magnification correction process.

21. An information storage device with an executable program stored thereon, wherein the program instructs a computer to perform steps of:
- acquiring an image obtained by photoelectrically converting an object image formed by an objective lens that includes a movable lens that is configured so that an in-focus object plane position is changed along with a change in angle of view;
- setting a reference lens position based on a moving range of the movable lens during a wobbling operation, the reference lens position being a reference position of the movable lens, and the wobbling operation being performed every given cycle during an autofocus (AF) operation; and
- performing a magnification correction process that reduces a change in the angle of view of the image due to a change in position of the movable lens during the wobbling operation relative to the reference lens position; wherein
- a telescopic-side end position of the movable lens within the movable range of the movable lens being a telescopic end, and a wide-angle-side end position of the movable lens within the movable range of the movable lens being a wide-angle end, and
- implementing the AF operation when the movable lens is situated between the telescopic end and a given position that is arbitrarily set between the wide-angle end and the telescopic end.

22. An information storage device with an executable program stored thereon, wherein the program instructs a computer to perform steps of:
- acquiring an image obtained by photoelectrically converting an object image formed by an objective lens that includes a movable lens that is configured so that an in-focus object plane position is changed along with a change in angle of view;
- setting a reference lens position based on a moving range of the movable lens during a wobbling operation, the reference lens position being a reference position of the movable lens, and the wobbling operation being performed every given cycle during an autofocus (AF) operation;
- performing a magnification correction process that reduces a change in the angle of view of the image due to a change in position of the movable lens during the wobbling operation relative to the reference lens position; and
- allowing a user to adjust the position of the movable lens; wherein
- starting or stopping the AF operation based on an operation performed by the user to adjust the position of the movable lens;
- a telescopic-side end position of the movable lens within the movable range of the movable lens being a telescopic end, and a wide-angle-side end position of the movable lens within the movable range of the movable lens being a wide-angle end, and
- starting the AF operation when the user has performed the operation to adjust the position of the movable lens to a telescopic position corresponding to the telescopic end, and has performed an operation to adjust the position of the movable lens beyond the telescopic position.

* * * * *